United States Patent
Nagaya et al.

(10) Patent No.: US 11,649,912 B2
(45) Date of Patent: May 16, 2023

(54) PIPE CONNECTOR

(71) Applicant: TOGO SEISAKUSYO CORPORATION, Aichi (JP)

(72) Inventors: Takanori Nagaya, Aichi (JP); Kenji Tozaki, Aichi (JP); Makoto Kishida, Hiroshima (JP); Noriaki Fujita, Hiroshima (JP)

(73) Assignee: TOGO SEISAKUSYO CORPORATION, Aichi (JP)

( * ) Notice: Subject to any disclaimer, the term of this patent is extended or adjusted under 35 U.S.C. 154(b) by 553 days.

(21) Appl. No.: 16/648,978

(22) PCT Filed: Sep. 10, 2018

(86) PCT No.: PCT/JP2018/033366
§ 371 (c)(1),
(2) Date: Mar. 19, 2020

(87) PCT Pub. No.: WO2019/059013
PCT Pub. Date: Mar. 28, 2019

(65) Prior Publication Data
US 2020/0292116 A1 Sep. 17, 2020

(30) Foreign Application Priority Data
Sep. 22, 2017 (JP) .............................. JP2017-182115

(51) Int. Cl.
*F16L 37/091* (2006.01)
*F16L 37/138* (2006.01)
*F16L 37/14* (2006.01)

(52) U.S. Cl.
CPC ........... *F16L 37/091* (2013.01); *F16L 37/138* (2013.01); *F16L 37/14* (2013.01)

(58) Field of Classification Search
USPC ................................................ 285/317, 319
See application file for complete search history.

(56) References Cited

U.S. PATENT DOCUMENTS 7,527,303 B2  5/2009  Furuya
7,845,684 B2  12/2010  Gaudin
(Continued)

FOREIGN PATENT DOCUMENTS

JP   H04-14893 U     2/1992
JP   2003-254482 A   9/2003
(Continued)

OTHER PUBLICATIONS

JP-2013032807-A Translation (Year: 2013).*
(Continued)

*Primary Examiner* — Aaron M Dunwoody
(74) *Attorney, Agent, or Firm* — Smith, Gambrell & Russell, LLP

(57) ABSTRACT

Fretting wear in a pipe connector is avoided in advance.

In a connector body (1), there is provided a gate member (29) having spring portions (33) that allow a pipe (P) to be inserted up to a regular depth while maintaining a contact state with the pipe (P). When a retainer (37) is pushed in with the pipe (P) being inserted to the connector body (1) up to the regular depth, locking legs (45) of the retainer (37) are locked to a bulge portion (6) of the pipe (P) and each locking leg (45) enters between the pipe (P) and the spring portion (33) and elastically displaces the spring portion (33) in a direction away from the pipe (P), thereby eliminating the contact state.

13 Claims, 28 Drawing Sheets

(56) References Cited

U.S. PATENT DOCUMENTS

2004/0036283 A1     2/2004   Furuya
2009/0261582 A1   10/2009   Gaudin

FOREIGN PATENT DOCUMENTS

| JP | 2004-060884 A | | 2/2004 |
|----|---------------|---|--------|
| JP | 2004-251319 A | | 9/2004 |
| JP | 2009-236206 A | | 10/2009 |
| JP | 2010-509553 A | | 3/2010 |
| JP | 2013-032807 A | | 2/2013 |
| JP | 2013032807 A | * | 2/2013 |

OTHER PUBLICATIONS

International Search Report for PCT/JP2018/033366, dated Nov. 27, 2018 (4 pgs. with English translation).
Written Opinion of the International Searching Authority for PCT/JP2018/033366, dated Nov. 27, 2018 (3pgs.).
European Search Report dated Mar. 23, 2021 for the European Patent Application No. 18 857 807.4.
International Preliminary Report on Patentability for International Patent Application No. PCT/JP2018/033366 dated Mar. 24, 2021 (4 pages in Japanese with English Translation).

* cited by examiner

PIPE CONNECTOR

TECHNICAL FIELD

The present invention relates to a pipe connector.

BACKGROUND ART

Conventionally, a pipe connector that can detect that a pipe to be connected is inserted up to a regular depth has been known. The following Patent Literature 1 can be cited as a document disclosing this type of pipe connector.

In this pipe connector, a metal retainer for preventing the pipe from coming off is incorporated in a connector body into which the pipe (made of metal) is inserted. The retainer is provided with a pair of retaining pieces and a pair of detection pieces, which are arranged orthogonal to each other.

During a pipe insertion process, a larger-diameter bulge portion formed at a distal end portion of the pipe passes through both retaining pieces of the retainer while flexibly deforming the retaining pieces, and when the pipe has been inserted up to a regular depth, the retaining pieces are elastically returned and locked to the bulge portion, thereby holding the pipe in a retained state.

On the other hand, when the pipe is in a half-insertion state (a state where the pipe has not been inserted up to the regular depth), push-in operation of a checker which is performed following the pipe insertion work is not allowed to be performed. That is, when the pipe is in the half-insertion state, both detection pieces of the retainer are not spread by the bulge portion up to a regular state, so that detection legs of the checker and the detection pieces of the retainer interfere with each other when the checker is pushed in. As a result, half-insertion of the pipe is detected.

On the contrary, when the pipe has been inserted up to the regular depth, the bulge portion spreads both detection pieces of the retainer up to the regular state, so that the detection legs of the checker are allowed to enter the spread space. As a result, the checker is allowed to be pushed in, and thereby, regular insertion of the pipe is detected and the pipe is retained.

CITATION LIST

Patent Literature

Patent Literature 1: JP 2013-32807 A

SUMMARY OF INVENTION

Technical Problems

As described above, in the state where the pipe has been inserted up to the regular depth, both detection pieces of the retainer are in the spread state by the bulge portion (refer to FIG. 9 of Patent Literature 1). That is, after pipe connection work is completed, both detection pieces and the bulge portion are in abutment with each other.

By the way, the above-described pipe connector is used as a part of a fuel pipe and is often installed in an engine compartment. For this reason, vibration of the engine is transmitted to the pipe, so that the pipe is subject to micro high-speed vibration in a rotational direction or in an axial direction. It is also known that vibration similar to the above is caused due to a pulsation of the fuel pumped through the pipe.

As a result of generation of such vibrations, there has been a concern that both detection pieces and the bulge portion are rubbed against each other and fretting wear is caused between them.

The present invention has been completed based on the circumstances described above, and an object is to avoid fretting wear inside a pipe connector in advance.

Solutions to Problems

A pipe connector according to the present invention includes a connector body, a gate member, and a retainer. A pipe having a larger-diameter bulge portion at an end portion thereof can be inserted into the connector body. The gate member is incorporated in the connector body and has a spring portion. When the pipe is inserted into the connector body, the spring portion abuts against the pipe and is elastically displaced in a direction of retracting outward while maintaining an abutment state to allow the pipe to be inserted up to a regular depth. The retainer is assembled to the connector body such that push-in operation of the retainer with respect to the connector body can be performed in a state where the pipe is inserted to the connector body up to the regular depth. The retainer has a lock portion, and when the push-in operation is performed to the connector body up to a proper locking position, the lock portion is locked to the bulge portion and hold the pipe in a retained state. When the retainer is pushed in up to the proper locking position, the lock portion enters between the pipe and the spring portion and elastically displaces the spring portion in a direction away from the pipe.

Advantageous Effects of Invention

According to the present invention, when the pipe has been inserted to the connector body up to the regular depth, the spring portion of the gate member is elastically displaced and is in abutment against the pipe. After the insertion of the pipe, when the push-in operation of the retainer is performed, the lock portion of the retainer is locked to the bulge portion of the pipe, so that the pipe is held in the retained state. Furthermore, when the push-in operation of the retainer is performed, the lock portion enters between the pipe and the spring portion and elastically displaces the spring portion outward. As a result, the spring portion is separated from the pipe.

Therefore, it is possible to avoid wear due to sliding between the pipe and the gate member in advance.

DESCRIPTION OF EMBODIMENT

Figure 1:
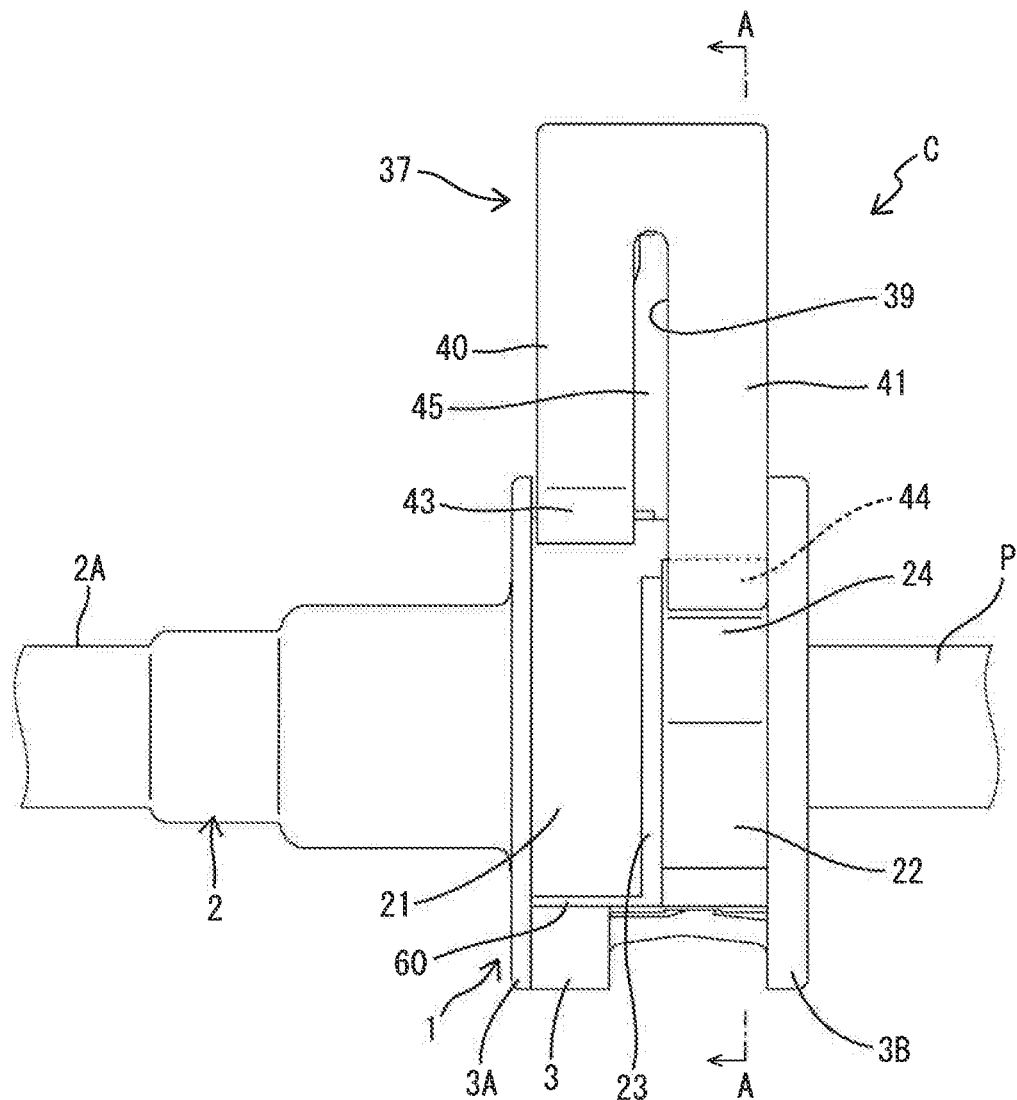
FIG. 1 is a front view illustrating a pipe connector with a checker removed in a first embodiment.
Figure 1:
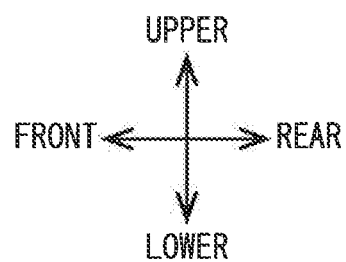

Preferred embodiments of the present invention will be described.

(1) In a pipe connector of the present invention, the spring portion may include a projecting portion that is protrudingly formed on an opposite surface of the spring portion to the lock portion. The projecting portion abuts against the lock portion when the retainer is pushed in.

According to such a configuration, flexible deformation of the spring portion by the lock portion can be performed easily and smoothly.

(2) Instead of the configuration (1) described above, the projecting portion may be protrudingly formed on an opposite surface of the lock portion to the spring portion.

According to such a configuration, too, flexible deformation of the spring portion can be performed easily and smoothly.

(3) In the case where the projecting portion is provided on the spring portion, the following configuration may be employed. In a state where the pipe is not inserted to the connector body or in a first half time of insertion of the pipe, at least a part of the spring portion is located so as to be able to interfere with the lock portion with respect to an entry path of the lock portion in the push-in operation of the retainer, so that the push-in operation of the retainer is restricted. In a second half time of the insertion of the pipe and when the pipe has not reached a regular depth with respect to the connector body, the spring portion is located so as to be able to avoid interference with the lock portion with respect to the entry path, but the bulge portion is allowed to interfere with the lock portion with respect to the entry path, so that the push-in operation of the retainer is restricted. In a state where the pipe is inserted to the connector body up to the regular depth, the bulge portion is displaced to a position outside the entry path, so that the push-in operation of the retainer is allowed.

According to the above configuration in which the projecting portion is provided on the spring portion, in a state where the pipe is not inserted or in a first half time of the insertion, the spring portion is not in contact with the bulge portion of the pipe at all, or even when being in contact with the bulge portion, a deflection amount of the spring portion is small, so that a part of the spring portion is located in the entry path of the lock portion. Therefore, the push-in operation of the retainer is restricted by the interference between the spring portion and the lock portion.

In a second half time of the insertion of the pipe, though the pipe has not been regularly inserted yet, the spring portion itself is greatly deflected due to the abutment of the projecting portion of the spring portion against the bulge portion of the pipe, so that the spring portion is located to be almost retracted from the entry path. However, the bulge portion of the pipe is located in the entry path instead. Therefore, the push-in operation of the retainer is restricted by the interference between the lock portion and the bulge portion.

That is, even when the retainer is inadvertently going to be pushed in though the pipe has not been regularly inserted to the connector body, the lock portion interferes with the spring portion or the bulge portion of the pipe, so that the push-in operation of the retainer is restricted.

(4) In the case where the projecting portion is provided on the lock portion, the following configuration may be employed. In a state where the pipe is not inserted or half-inserted to the connector body, at least a part of the spring portion is located so as to be able to interfere with the lock portion with respect to the entry path of the lock portion in the push-in operation of the retainer, so that the push-in operation of the retainer is restricted. In a state where the pipe is inserted to the connector body up to the regular depth, the spring portion is located so as to be able to avoid interference with the lock portion with respect to the entry path, so that the push-in operation of the retainer is allowed.

According to the above configuration in which the projecting portion is provided on the lock portion, since the projecting portion is not provided on the spring portion unlike the case of (3), an amount of displacement of the spring portion pushed by the abutment against the bulge portion is smaller compared to the configuration of (3). Accordingly, the spring portion is located in the entry path even in the state where the pipe is half-inserted, let alone in the state where the pipe is not inserted. Therefore, even if the retainer is going to be pushed in this state, the push-in operation cannot be performed due to the interference between the lock portion and the spring portion.

(5) The pipe connector of the present invention may further include a checker that is mounted on the connector body. The checker is ordinarily locked to the connector body so as not to be removable, but when the retainer has been pushed into the connector body up to the proper locking position, the checker is released from locking and become removable.

According to the above configuration, it can be detected by the removal of the checker that the retainer has been pushed in up to the proper locking position. Thus, by the removal of the checker, it can be ensured that the spring portion is separated from the pipe.

(6) In the pipe connector of the present invention, at least a portion of the lock portion that comes into contact with the pipe and the spring portion may be formed of resin.

According to this configuration, wear that may be caused between the lock portion, the pipe, and the spring portion can be reduced or eliminated by buffering action of resin.

(7) In the configuration of (6), the retainer may have a reinforcement structure that reinforces the lock portion.

According to this configuration, the lock portion is prevented from being bent and deformed when the lock portion enters between the pipe and the spring portion.

First Embodiment

First embodiment in which a pipe connector of the present invention is embodied will be described with reference to the drawings hereinafter.

Figure 2:
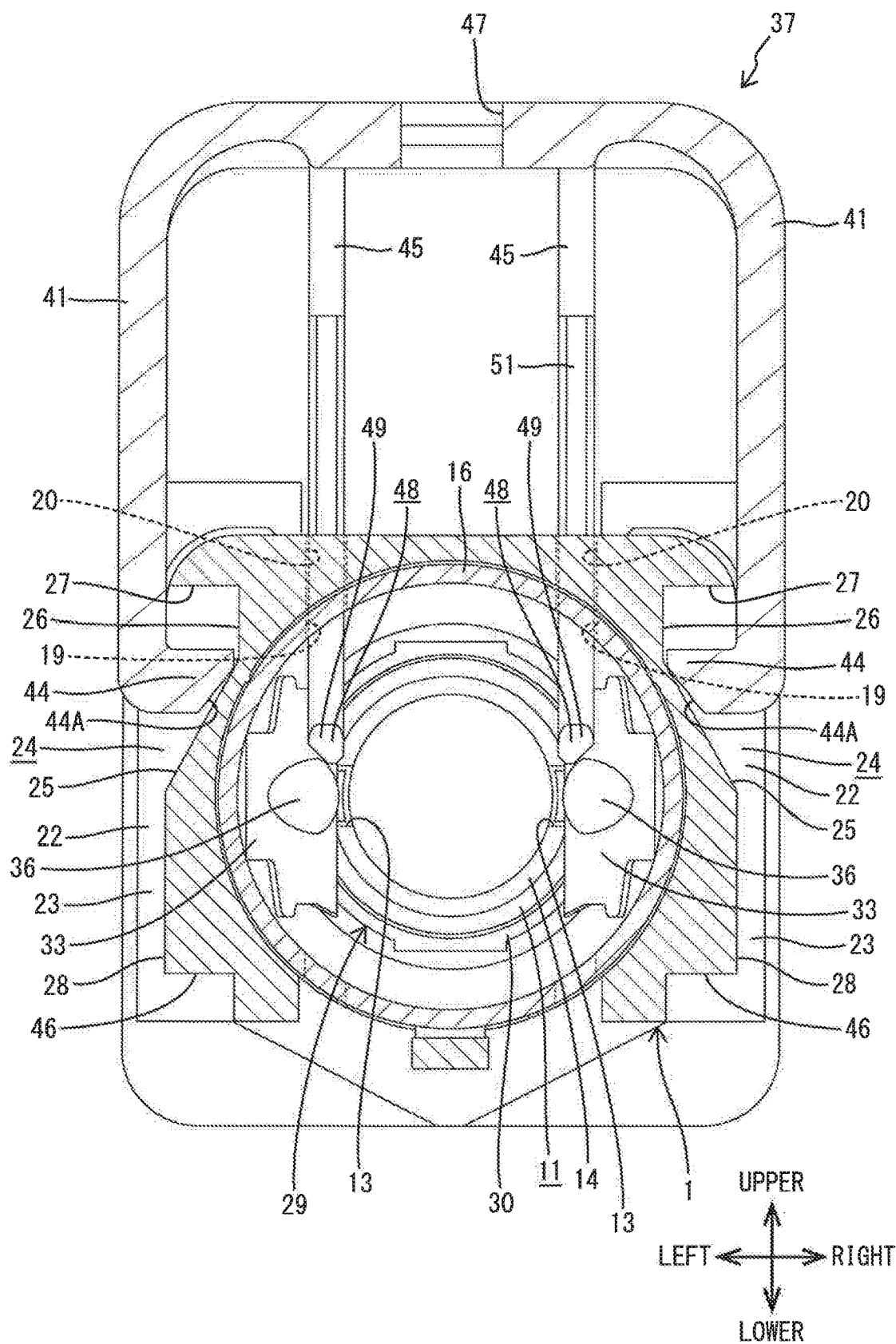
FIG. 2 is a cross-sectional view taken along line A-A in FIG. 1.

The connector of the present first embodiment constitutes a part of a fuel pipe of an automobile and is installed in an engine compartment. For convenience of a description, a left side in FIG. 1 is hereinafter referred to as "front", a right side is referred to as "rear", an upper side is referred to as "upper", a lower side is referred to as "lower". A left side in FIG. 2 is referred to as "left", and a right side is referred to as "right".

(Connector Body 1 and Joint Member 2)

A connector C has a connector body 1 made of synthetic resin. As shown in FIG. 1, in the connector C, a metal joint member 2 is assembled to a front portion of the connector body 1 in a state of being prevented from coming off. A front portion of the joint member 2 is formed with a pipe connection portion 2A having a pipe shape which is connected to an injector not shown.

Figure 3:
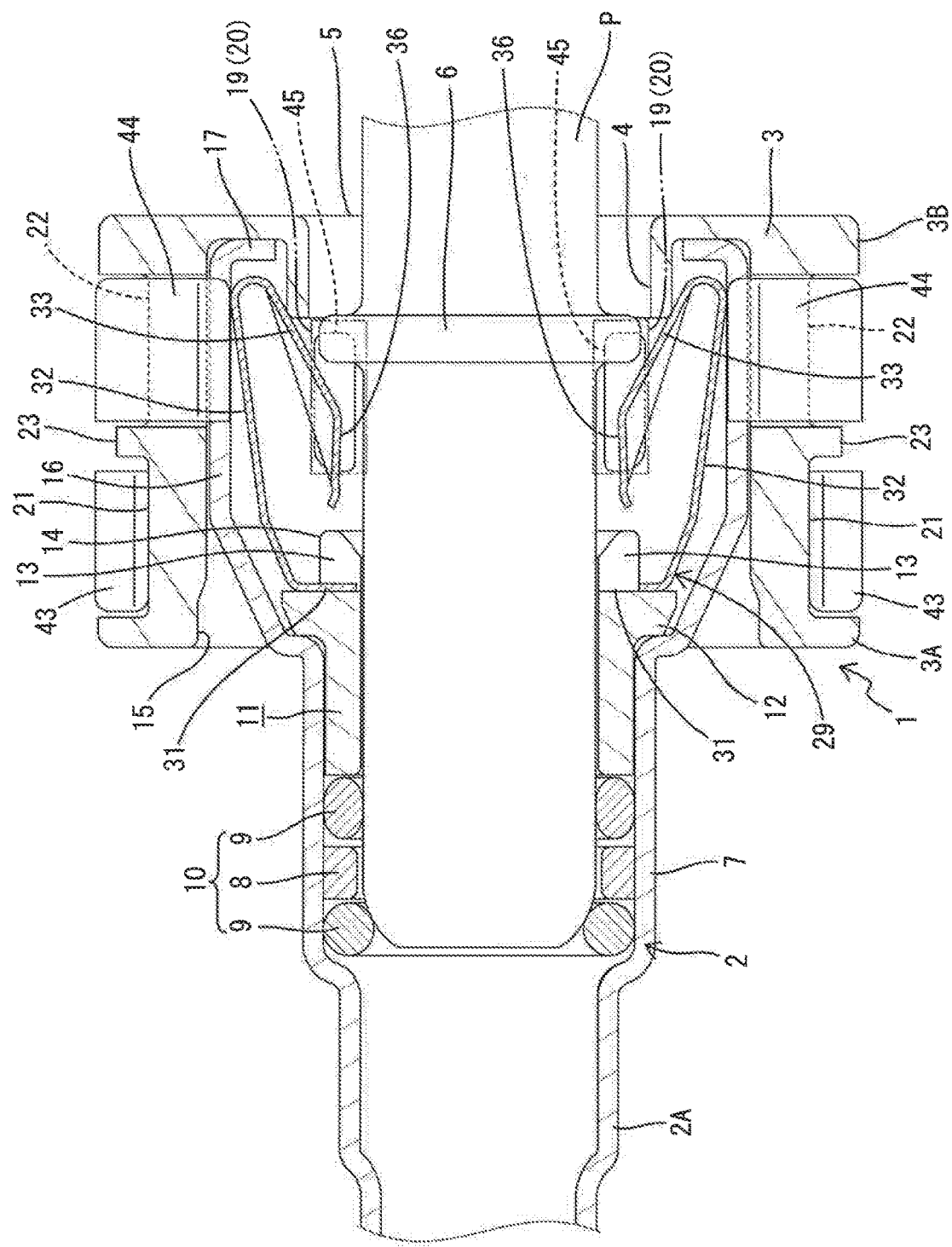
FIG. 3 is a cross-sectional view of a first half state in which a pipe is inserted with the checker removed, as seen from a lower side.

The connector body 1 is formed into a substantially rectangular cylindrical shape that is short in a front-rear direction, and front and rear ends of a main body portion 3 are respectively formed with rectangular plate-shape portions 3A and 3B, each of which protrudes in a flange shape. As shown in FIG. 3, an inside of the connector body 1 is formed in a hollow shape, and is opened to front and rear. As shown in FIG. 3, an insertion cylindrical portion 4 having a smaller diameter is coaxially formed in a rear end portion of the connector body 1 toward the front, and a rear end of the insertion cylindrical portion 4 serves as a pipe insertion port 5. One end side of a pipe P leading to a fuel tank is inserted from the pipe insertion port 5 along an axial direction. The pipe P is made of metal, and a bulge portion 6 having a larger diameter is formed at a position near the end portion of the pipe P so as to protrude over the entire circumference. On the other hand, a joint member insertion port 15 for inserting a rear portion of the joint member 2 is opened in the front plate-shape portion 3A.

As shown in FIG. 3, a portion of the joint member 2 near the connector body 1 is a seal accommodation portion 7. A seal unit 10 including a spacer 8 and O-rings 9 is provided inside the seal accommodation portion 7. The seal unit 10 (the O-ring 9) is in close contact with an outer circumferential surface of a distal end portion of the pipe P in a state where the pipe P is inserted up to a regular depth with respect to the connector C (a state shown in FIG. 13, FIG. 15, and the like), so that sealing is made.

As shown in FIG. 3, a bush 11 for preventing the seal unit 10 from coming off is arranged on a rear side of the seal unit 10. The bush 11 is made of synthetic resin and is formed into a substantially cylindrical shape through which the pipe P can be inserted. The bush 11 is formed with a stopper portion 12 at a portion near the rear protruding in a flange shape. In the bush 11, a cylindrical portion on a front side of the stopper portion 12 is inserted into the seal accommodation portion 7 in close contact, and a cylindrical portion on a rear side of the stopper portion 12 is a mounting base 14 for a gate member 29 described later. As shown in FIGS. 2 and 3, a pair of left and right positioning recesses 13 are provided to be recessed at a rear end edge of the mounting base 14. Each of the positioning recesses 13 is formed to be notched with a depth from the rear end edge of the bush 11 to the stopper portion 12. A positioning claw 31 of the gate member 29 described later is inserted into the positioning recess 13 so that the gate member 29 is mounted in a state of being positioned in a circumferential direction with respect to the bush 11 (refer to FIG. 21).

As shown in FIG. 3, a rear side of the seal accommodation portion 7 in the joint member 2 expands in a taper shape and continues to an expanded cylindrical portion 16. A rear end edge of the expanded cylindrical portion 16 is bent inwardly over the entire circumference, thereby forming a bent edge 17.

The joint member 2 is inserted from the joint member insertion port 15 with the expanded cylindrical portion 16 facing the connector body 1, and is attached in a state where an outer circumferential surface of the expanded cylindrical portion 16 is in close contact with a wall surface inside the connector body 1. At this time, the rear end portion of the expanded cylindrical portion 16 including the bent edge 17 is fitted in the insertion cylindrical portion 4 of the connector body 1 in an abutment state.

As shown in FIG. 2, through grooves 19 are formed at upper and lower respective two places on the circumferential surface of the expanded cylindrical portion 16 penetrating therethrough, and arranged with an interval in a left-right direction. Each through groove 19 is formed in a slit shape that is long in the front-rear direction. The through grooves 19 can be aligned with a pair of left and right insertion grooves 20 which are arranged on an upper surface of the connector body 1 so as to correspond to the through grooves 19, so that both locking legs 45 of a retainer 37 can be inserted therethrough.

As shown in FIG. 1, on both left and right side surfaces of the connector body 1, a portion sandwiched between both plate-shape portions 3A and 3B in the front-rear direction is relatively recessed, which forms guide grooves 21 and 22 for guiding push-in operation of the retainer 37. The guide grooves 21 and 22 are divided into the front guide groove 21 and the rear guide groove 22 by a central partition wall 23. Both guide grooves 21 and 22 are formed along an up-down direction. A groove bottom of the front guide groove 21 is formed as a flat and smooth surface having no recess over the entire length. On the other hand, in an upper portion of the rear guide groove 22, a temporary holding portion 24 for temporarily holding the retainer 37 at a temporary locking position (a position shown in FIG. 2, FIG. 11) before the retainer 37 is pushed in is formed to be recessed.

Figure 10:
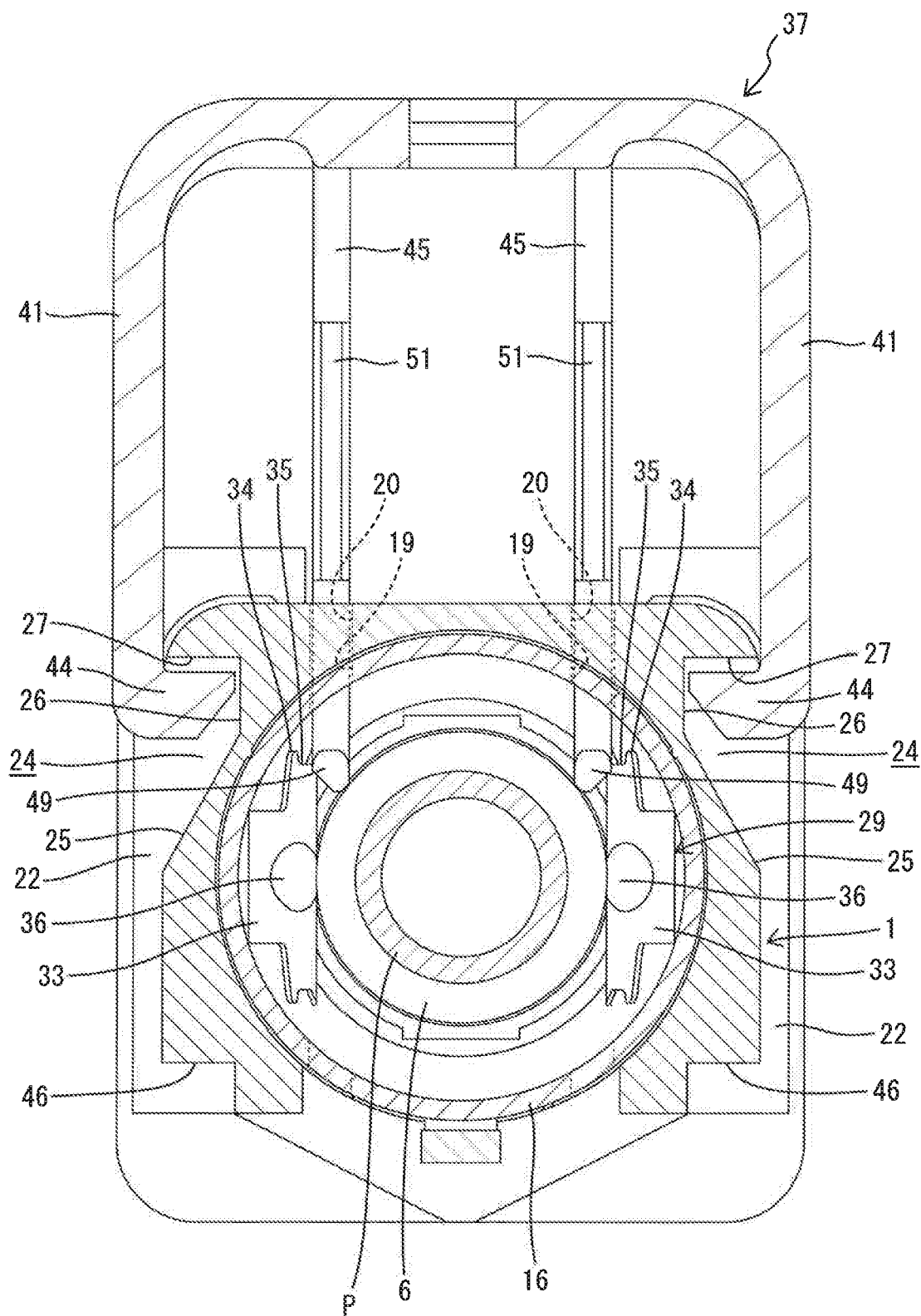
FIG. 10 is a side sectional view illustrating a halfway state in which the pipe is being inserted from the state shown in FIG. 2 and a state in which the entire retainer is retracted upward when a bulge portion passes, as seen from the rear side.

As will be described later, the retainer 37 is temporarily held at the temporary locking position by lower end portions of rear guide legs 41 abutting on temporary holding surfaces 25. When the retainer 37 is in the temporary locking position, the lower end portions of the locking legs 45 of the retainer 37 are located in front of an insertion path of the pipe P on the same path. Therefore, when the pipe P is inserted to the connector body 1 up to the regular depth, the pipe P must pass therethrough while avoiding interference with the locking legs 45. In order to allow this, in the present embodiment, the retainer 37 is configured to be retracted upward as shown in FIG. 10. In this case, both locking legs 45 receive a lifting force by contact with the bulge portion 6 of the pipe P, so that the entire retainer 37 is retracted straight upward without spreading the locking legs 45. Thus, the bulge portion 6 of the pipe P can be inserted up to the regular depth through both locking legs 45. After the pipe P has passed, the retainer 37 returns to the temporary locking position again, for example, by action of gravity, and the lower end portions of both locking legs 45 are locked to the bulge portion 6, whereby the pipe P becomes a temporary retained state (a state shown in FIG. 12).

The present embodiment illustrated and described the case where the pipe connector is mounted such that the retainer 37 is disposed in the up-down direction. Therefore, as an example of the operation when the retainer 37 once lifted from the temporary locking position returns to the temporary locking position again, it has been described as "returns to the temporary locking position by action of gravity". However, depending on installation conditions and the like, there may be a case where the pipe connector is mounted such that the retainer 37 is disposed laterally. In such a case, the following may be considered as another means for returning the retainer 37 to the temporary locking position.

First conceivable means is pressing an operation plate 38 of the retainer 37. According to this means, the retainer 37 can be returned regardless of an installation direction of the connector C. Further, another conceivable means is, in place of a form of a erecting surface 26 of the connector body 1 in the present example, providing an inclined surface having a slope directed opposite to the temporary holding surface 25, so that the rear guide legs 41 is elastically deformed to open the legs when the retainer 37 is lifted from the temporary locking position. In this case, the retainer 37 returns to the temporary locking position using elastic restoring force of the rear guide legs 41 which is generated after the pipe P is regularly inserted.

When the retainer 37 is in the temporary locking position, the rear guide legs 41 are in a substantially natural state. On the other hand, the rear guide legs 41 are elastically deformed outward in the left-right direction (in a leg opening direction) when each locking claws 44 of the retainer 37 passes through a vertical surface 28 that is continuous from a lower edge of the temporary holding surface 25.

(Gate Member 29)

As shown in FIG. 3 and the like, the gate member 29 is incorporated in the connector body 1, more specifically, in the expanded cylindrical portion 16 of the joint member 2 and behind the bush 11. The gate member 29 is made of metal, and its specific configuration is shown in FIG. 4 to FIG. 6.

The gate member 29 is entirely formed of a flat plate material and has a ring-shaped attachment base 30. The gate member 29 is mounted in its entirety by fitting the attachment base 30 onto the mounting base 14 of the bush 11 in a press-fitted state. As shown in FIG. 5, the pair of left and right positioning claws 31 protrudes radially inward from an inner circumferential edge of the attachment base 30. As described above, the attachment base 30 are fitted onto the mounting base 14 of the bush 11 while both positioning claws 31 are conformed to the corresponding positioning recesses 13 in the bush 11, whereby the gate member 29 is attached in a state of being circumferentially positioned with respect to the bush 11.

Figure 4:
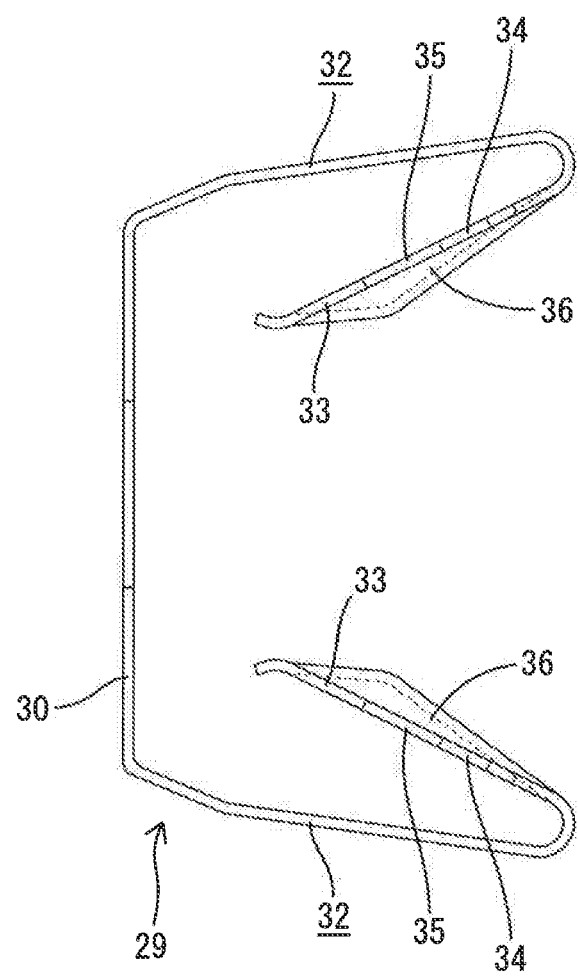
FIG. 4 is a plan view of a gate member.

As shown in FIG. 4, a pair of left and right gate pieces 32 (gate portions) extend rearward from portions on an outer peripheral edge of the attachment base 30 corresponding to both positioning claws 31. Each gate piece 32 as a whole is formed to be folded back obliquely toward the pipe P side. Each portion after being folded back becomes a spring portion 33 and is flexible in a radial direction (the left-right direction and the direction orthogonal to an entry direction of the locking leg 45 of the retainer 37). In the gate pieces 32, portions before being folded back are each formed with a uniform width over the entire length, and the portions extend from the attachment base 30 obliquely rearward in a direction away from each other, as shown in FIG. 4. As shown in FIG. 3, in the state where the gate member 29 is attached, a vicinity of the folded back portion in each gate piece 32 is in abutment on a wall surface near the bent edge 17 in the expanded cylindrical portion 16.

Figure 5:
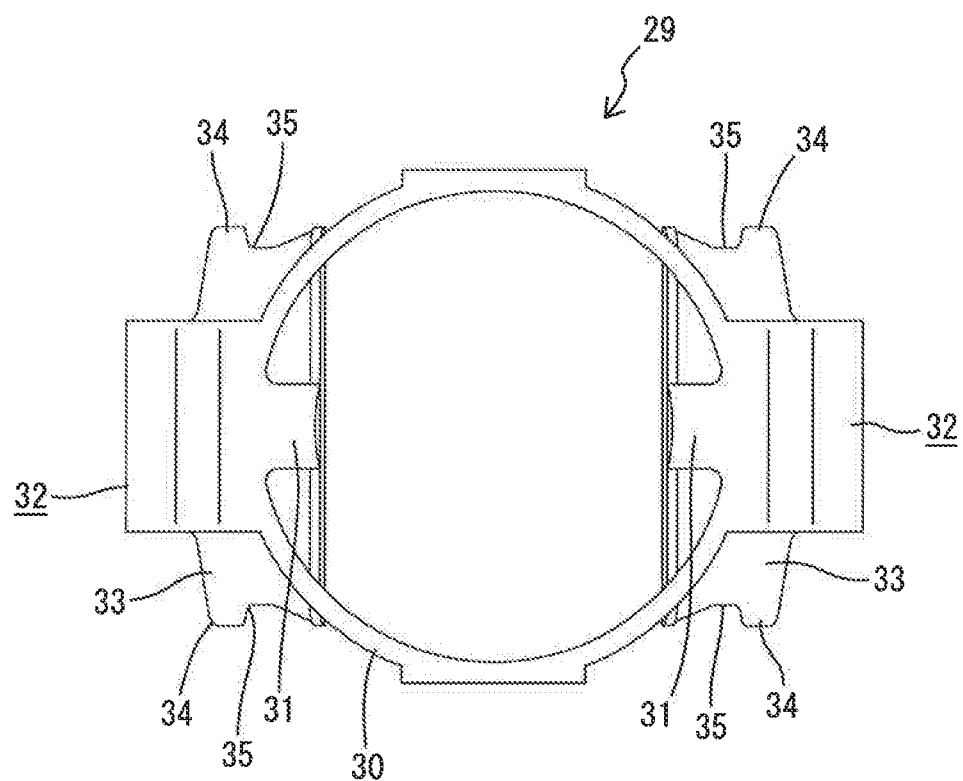
FIG. 5 is a side view of the gate member as seen from a front side.
Figure 6:
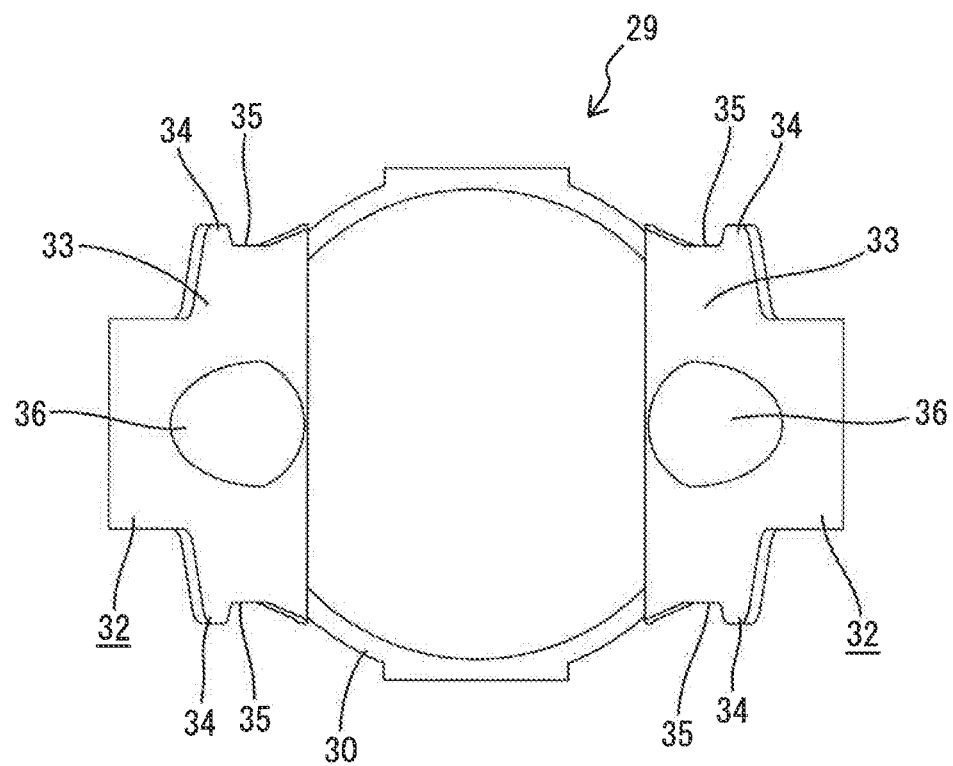
FIG. 6 is a side view of the gate member as seen from a rear side.

As shown in FIG. 5, FIG. 6, a distal end side of each spring portion 33 of the gate piece 32 is formed to be wider, immediately after being folded back, than a portion before being folded back. Start-end portion that is widened is formed with protrusions 34 protruding in the up-down direction. In the side edge of the spring portion 33, a portion that is adjacent on the distal end side from the protrusions 34 continues from the rear edge of the protrusions 34 to extend forward substantially horizontally, serving as a trough, and then continues to an inclined surface that ascends or descends toward the distal end. Thus, the above-described trough portion forms a slip prevention recess 35.

Figure 23:
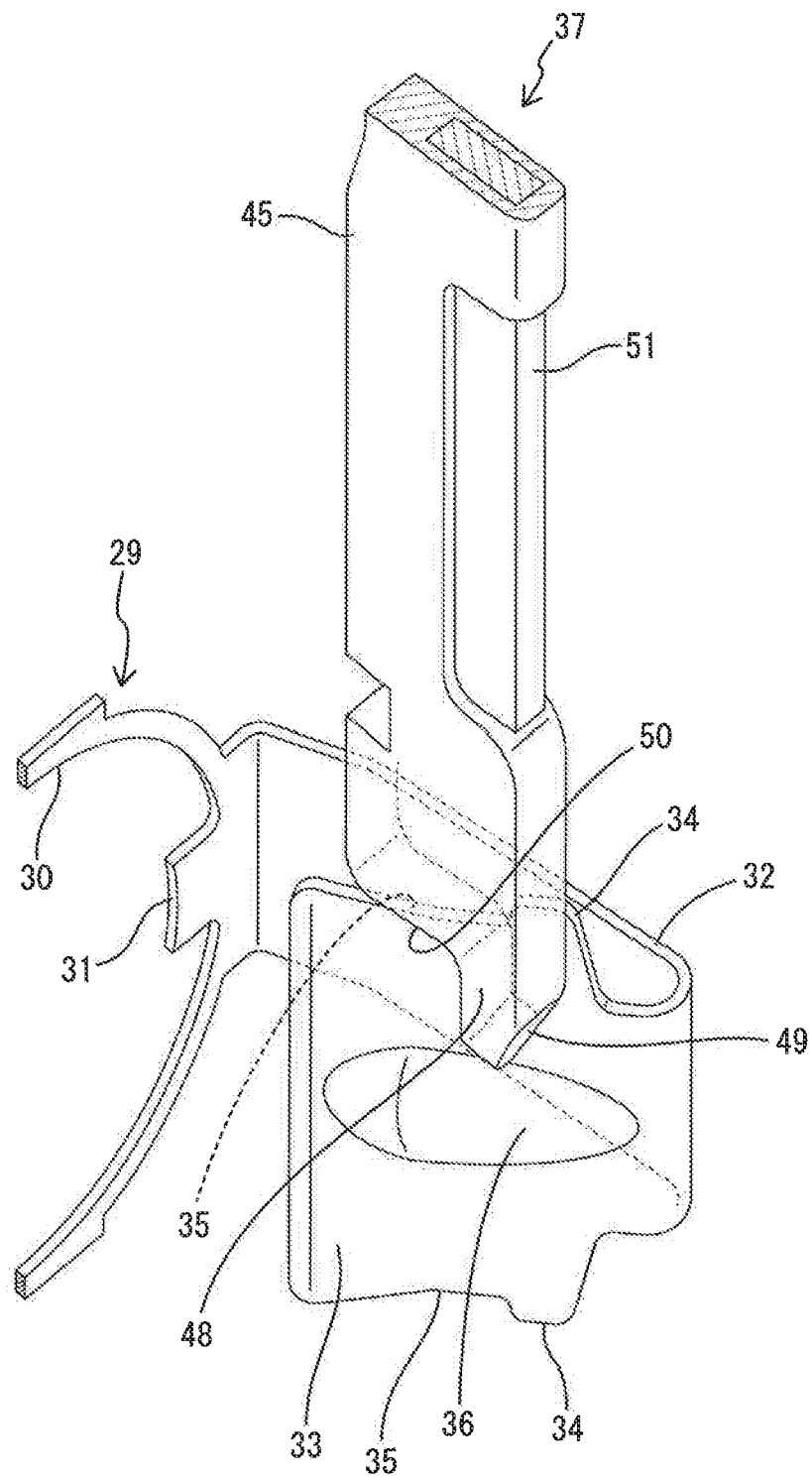
FIG. 23 is a perspective view illustrating a state in which locking legs of the retainer interfere with gate pieces of the gate member.

As simply shown in FIG. 23, the slip prevention recess 35 serves as a portion that interferes with the lower end of the locking leg 45 of the retainer 37 while preventing the slippage when the retainer 37 is pushed in a state where the pipe P is half-inserted.

As shown in FIGS. 4 and 6 and the like, projecting portions 36 are protrudingly formed in pairs left and right at respective substantially central portions of the spring portions 33 in the up-down direction. Each projecting portion 36 bulges radially inward (a direction toward the pipe P), and the whole thereof is formed with a smooth curved surface. As shown in FIG. 23, each projecting portion 36 is formed into a substantially drop shape that is long from the folded base side to the distal end side in the spring portion 33. Each projecting portion 36 is formed such that a portion near the distal end of the spring portion 33 is a top portion. The top portion of the projecting portion 36 is provided at a position substantially below or above an intermediate portion of the slip prevention recess 35.

In the present first embodiment, the retainer 37 in the temporary locking position is not allowed to be pushed to a proper locking position until the pipe P is inserted to the connector body 1 up to the regular depth, as well as in a non-inserted state of the pipe P. That is, until the pipe P is regularly inserted, the locking legs 45 of the retainer 37 interfere with the spring portions 33 or the bulge portion 6 of the pipe P even if the retainer 37 is pushed in.

As shown in FIG. 3, when the pipe P is inserted in the connector body 1 but has not yet abutted on the spring portion 33, the projecting portion 36 of each spring portions 33 and its peripheral portion (a portion including the slip prevention recess 35) are located in a region where the through groove 19 and the insertion groove 20 are projected on a plane. In other words, the slip prevention recess 35 is located on an entry path of the locking leg 45 of the retainer 37 to the connector body 1.

Figure 11:
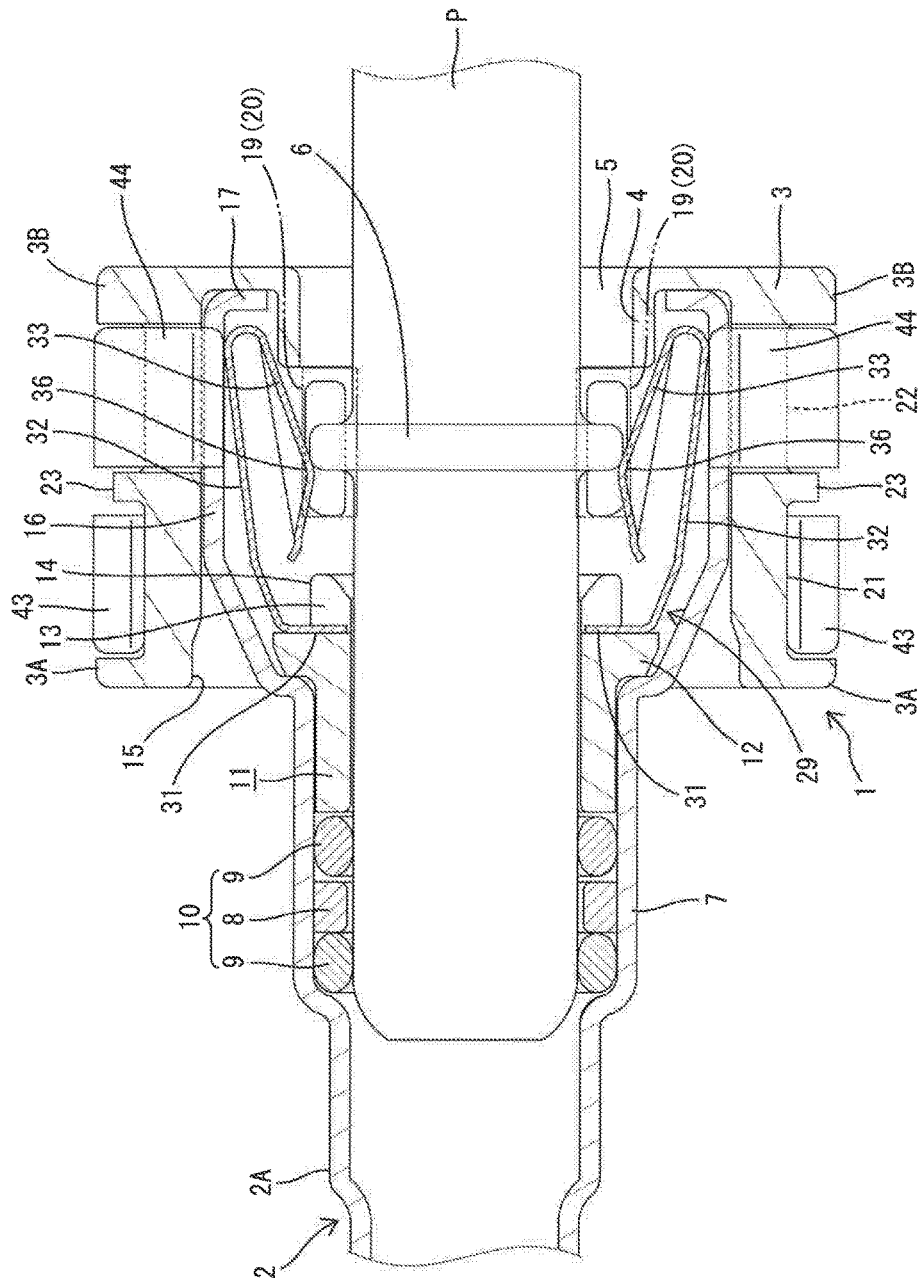
FIG. 11 is a cross-sectional view of a state when the pipe has been inserted until the bulge portion abuts against a top portion of a projecting portion, as seen from the lower side.

FIG. 11 illustrates a state in which the insertion of the pipe P has proceeded from the state of FIG. 3, and the bulge portion 6 abuts on the top portion of the projecting portion 36 of each spring portion 33. At this time, a deflection amount of each spring portion 33 is maximized. As shown in the figure, when the bulge portion 6 abuts on the top portion of the projecting portion 36 of the spring portion 33, the entire spring portion 33 including the slip prevention recess 35 is located almost outside the entry path of the locking leg 45. However, in place of the spring portion 33, the bulge portion 6 is located in the entry path of the locking leg 45. Therefore, in the half inserted state of the pipe P until the pipe P reaches the insertion depth at the position shown in FIG. 11, an interference partner of the locking leg 45 is the slip prevention recess 35 of the spring portion 33. When the pipe P is inserted up to the position shown in FIG. 11, the interference partner of the locking leg 45 is switched from the slip prevention recess 35 of the spring portion 33 to the bulge portion 6 of the pipe P.

Figure 13:
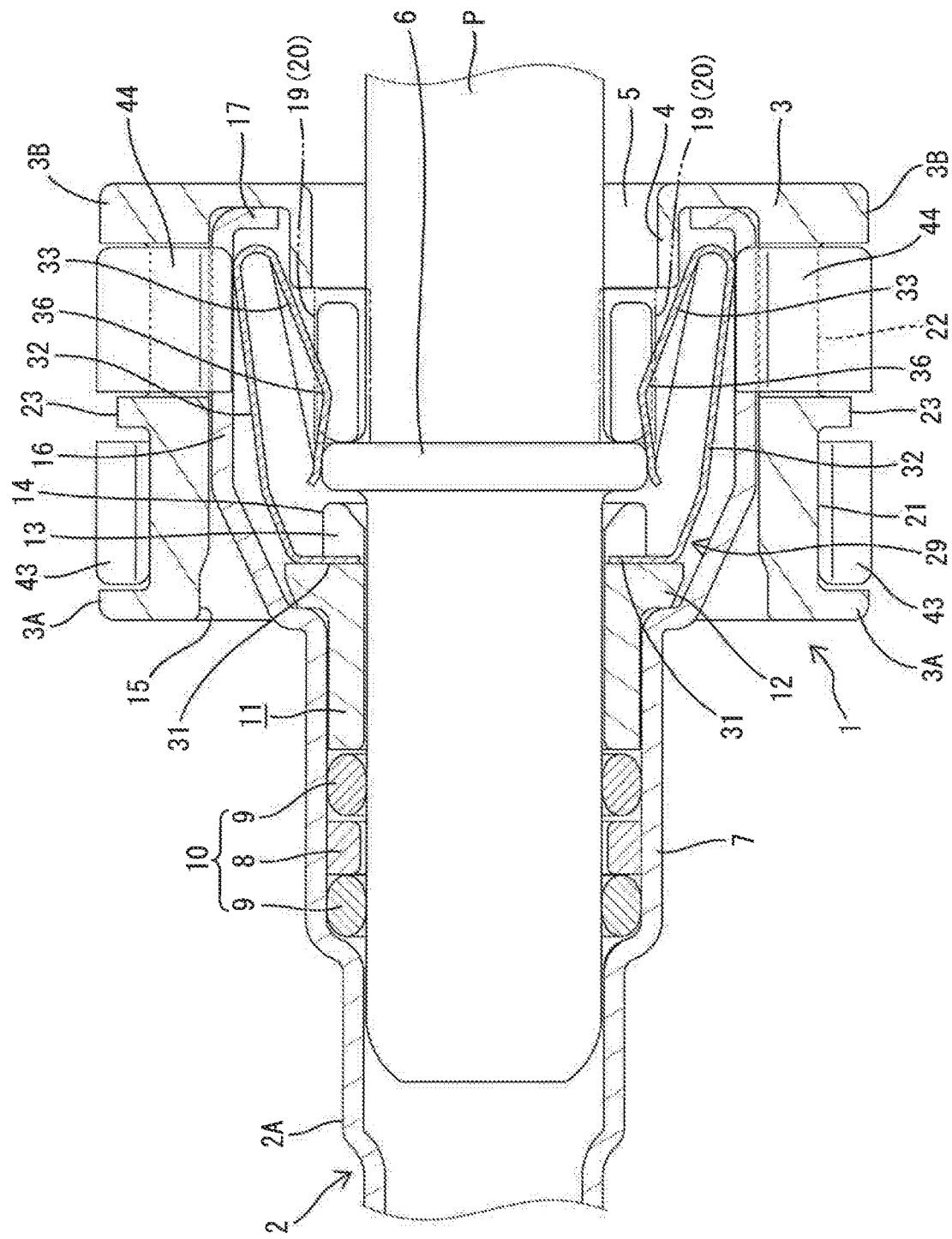
FIG. 13 is a cross-sectional view of the state in which the pipe is inserted up to the regular depth but before the push-in operation of the retainer is performed, as seen from the lower side.

FIG. 13 illustrates a state where the pipe P has been inserted to the connector body 1 up to the regular depth. As shown in the figure, in a state where the pipe P is regularly inserted, the bulge portion 6 of the pipe P has passed through the top portion of the projecting portion 36 of each spring portion 33 and is located forward away from the entry path. At this time, though each spring portion 33 is slightly elastically restored from the maximum deflected state shown in FIG. 11, the slip prevention recess 35 is located outside the entry path, and almost only the projecting portion 36 is located in the entry path.

(Retainer 37)

Figure 7:
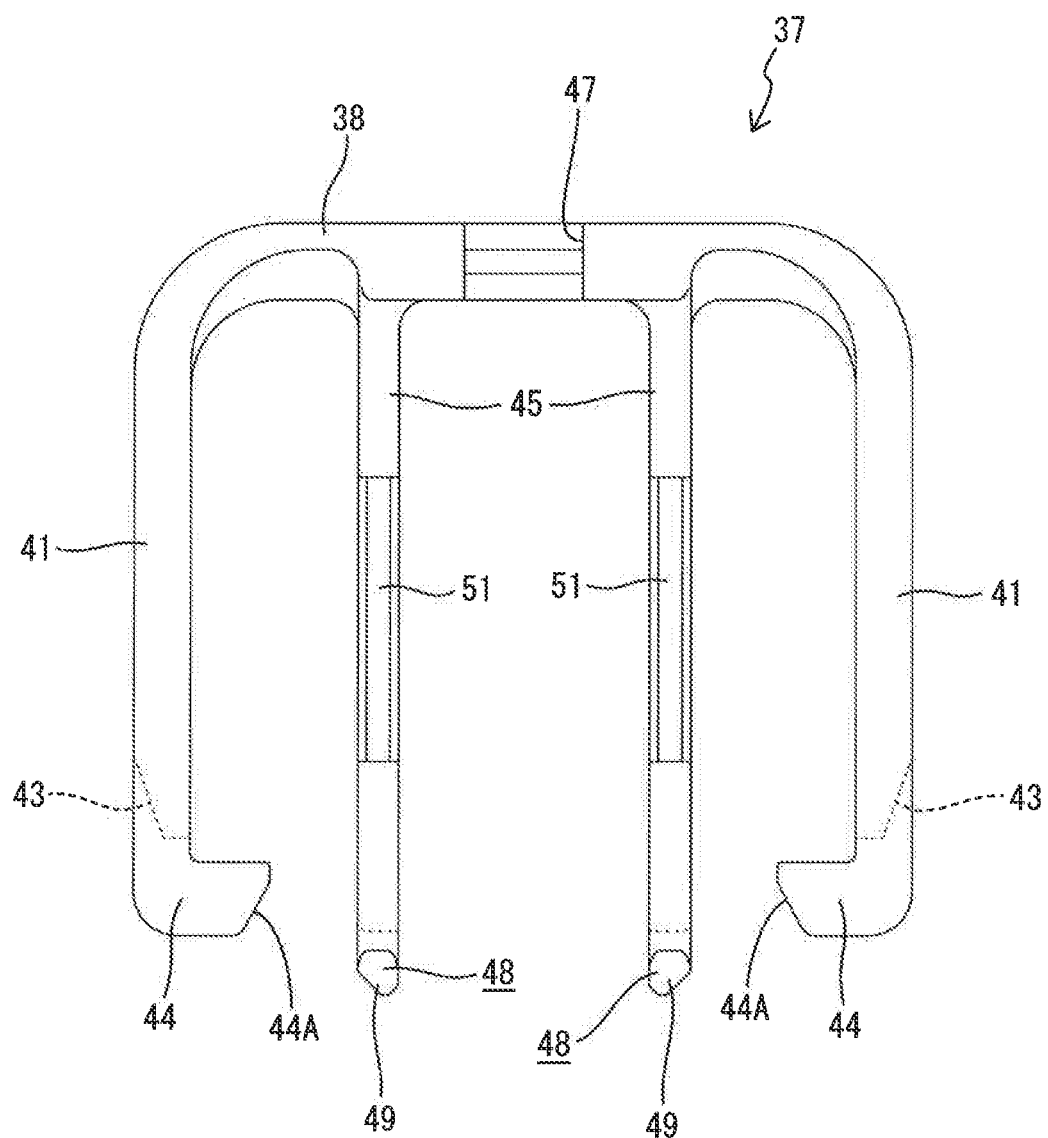
FIG. 7 is a side view of a retainer as seen from the rear side.
Figure 8:
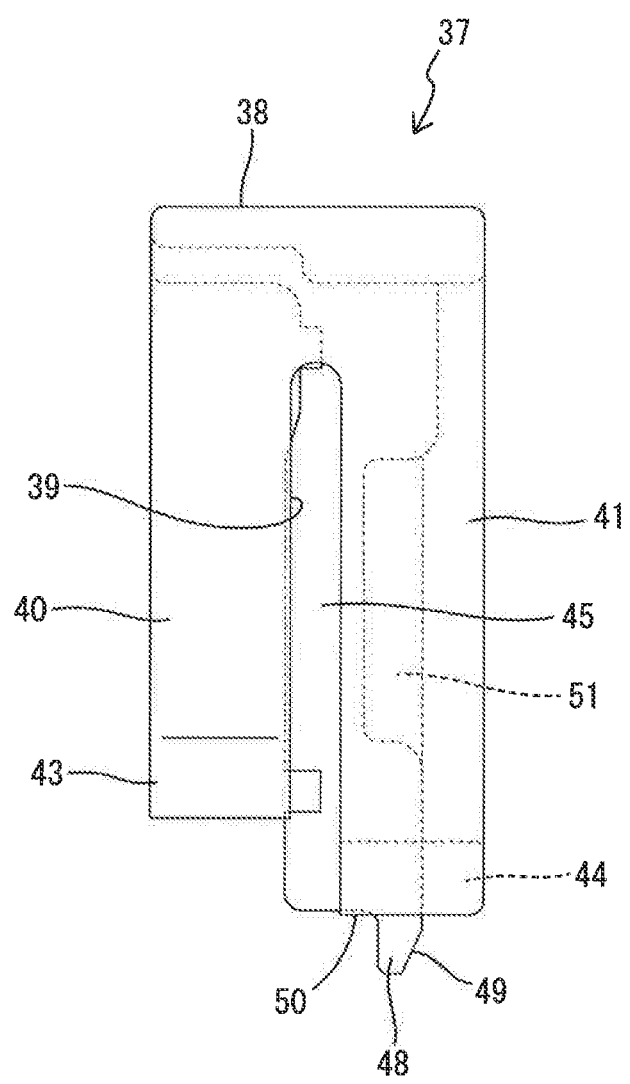
FIG. 8 is a front view of a retainer.
Figure 9:
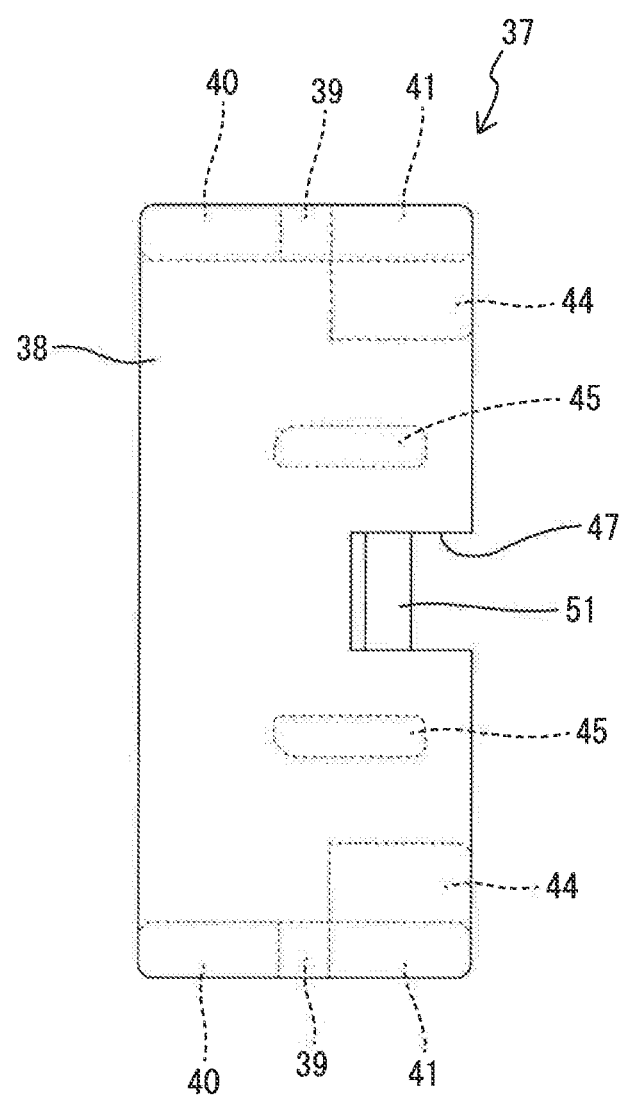
FIG. 9 is a plan view of the retainer.

A specific configuration of the retainer 37 is shown in FIG. 7 to FIG. 9. The retainer 37 is made of synthetic resin, and plays a role of detecting half-insertion of the pipe P and retaining the pipe P.

The operation plate 38 is provided on an upper surface of the retainer 37 for an operator to perform the push-in operation. The operation plate 38 is allowed to abut on the upper surface of the connector body 1 when the retainer 37 is pushed into the connector body 1 (the expanded cylindrical portion 16). As shown in FIG. 8, a pair of guide legs 40 and 41 are extended downward on left and right side surfaces of the retainer 37 with a slit 39 sandwiched therebetween from the front and rear. With these configurations, the retainer 37 is mounted straddling the connector body 1 from the left-right direction.

When the retainer 37 is in the temporary locking position, both front guide legs 40 are fitted into upper portions of the front guide grooves 21 of the connector body 1. In the push-in operation of the retainer 37, the front guide legs 40 are pushed down along the front guide grooves 21 thereby guiding the push-in operation. The lower end portions of the front guide legs 40 have side surfaces on the left and right side each of which is formed with a pressing surface 43 that is an inclined surface for forcibly spreading legs of a checker 42.

As shown in FIG. 8, the rear guide legs 41 are formed longer than the front guide legs 40, and are allowed to be flexibly deformed in the left-right direction (leg opening deformation) in a preferable manner. Since the rear guide leg 41 is separated from the front guide leg 40 by the slit 39 except for the root thereof, the rear guide legs 41 are allowed to be deformed to open the legs independently of the front guide legs 40.

The locking claw 44 is formed to project inwardly at the lower end portion of each rear guide leg 41. When the retainer 37 is in the temporary locking position, a distal end surface 44A of each locking claw 44 conforms to the temporary holding surface 25 of the rear guide groove 22 and is almost in an abutment state.

The retainer 37 is held so as not to move downward from the temporary locking position by the lower end portion of each locking leg 45 abutting on the slip prevention recess 35 of the gate member 29.

As shown in FIG. 2, when the retainer 37 is in the temporary locking position, there is a gap between an upper surface of a distal end of each locking claw 44 and a ceiling surface 27 in the temporary holding portion 24 of the connector body 1 in the up-down direction, and the entire retainer 37 is allowed to be moved upward by the height of the gap. That is, due to the presence of this gap, the interference between the locking leg 45 and the bulge portion 6 of the pipe P, which will be described below, can be avoided and the pipe P can be inserted up to the regular depth. In the present embodiment, after the pipe P has passed, the retainer 37 in its entirety moves back downward due to action of gravity and returns to a position where the locking legs 45 can interfere with the bulge portion 6 again (the temporary locking position). This prevents the pipe P from being inadvertently displaced in the direction of coming out until the retainer 37 is pushed in.

Figure 14:
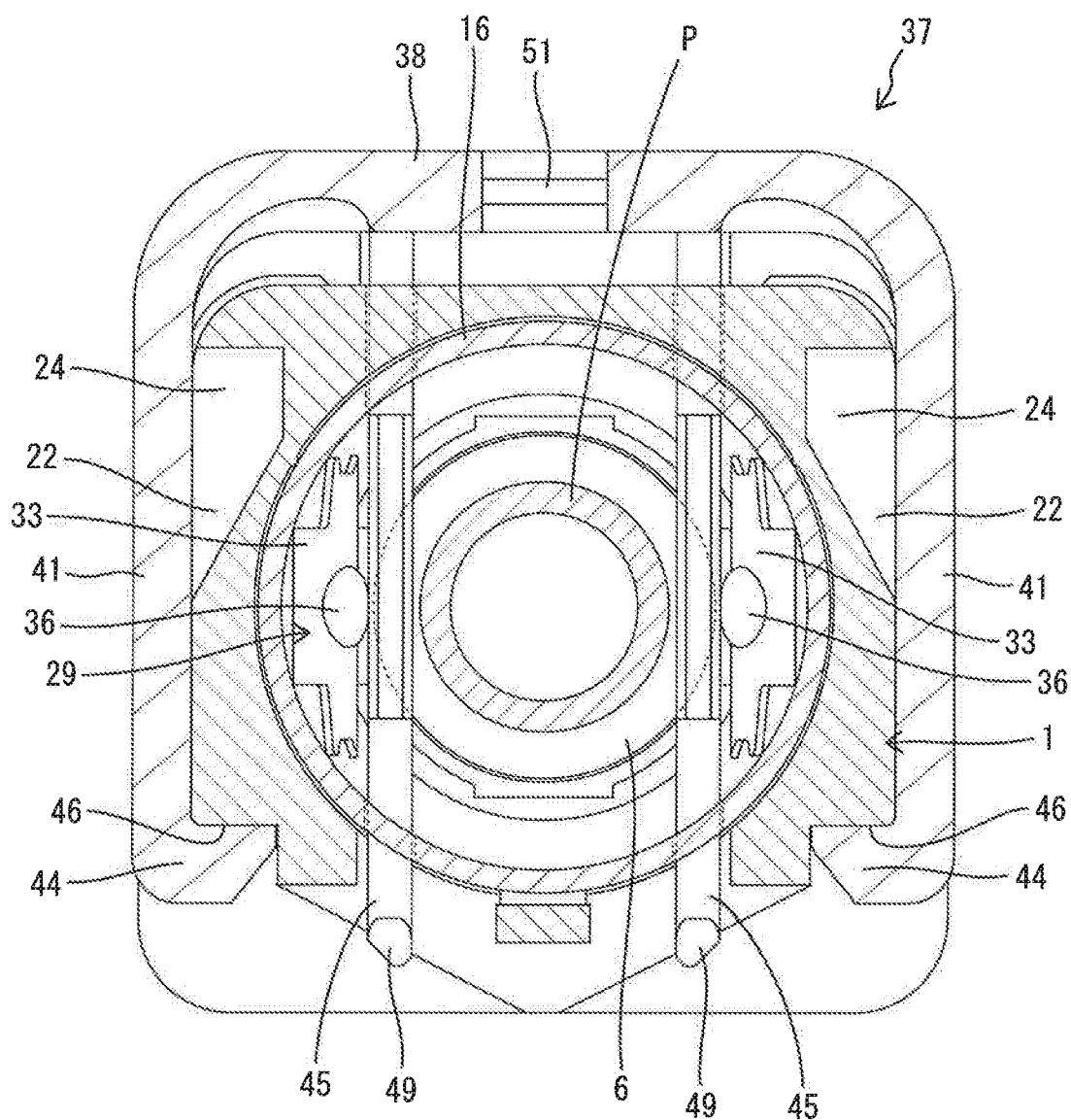
FIG. 14 is a side sectional view of a state in which the push-in operation of the retainer has been performed, as seen from the rear side.

The rear guide legs 41 are fitted in along the rear guide grooves 22 of the connector body 1, and guide the push-in operation of the retainer 37 to the proper locking position in cooperation with the front guide legs 40. As shown in FIG. 14, when the push-in operation of the retainer 37 is completed, both locking claws 44 are respectively locked to locking step portions 46 each of which is formed at a lower end portion of each rear guide groove 22. A position of the retainer 37 shown in FIG. 14 is the proper locking position.

As shown in FIG. 9, a notch 47 is formed to be recessed in a middle portion in the left-right direction of a rear edge of the operation plate 38. In a lower surface of the operation plate 38, the pair of left and right locking legs 45 described above extend downward at the portions sandwiching the above-described notch 47 from the left and right. Each locking legs 45 is formed with a front-rear width ranging from a position slightly retracted forward from the rear edge of the operation plate 38 to a middle portion in the front-rear direction of the operation plate 38.

As shown in FIGS. 7 and 8, the lower end of each locking leg 45 extends with a length that protrudes further downward than the lower ends of the rear guide legs 41, and the protruding portion is formed with a claw edge 48. As shown in FIG. 8, a guide surface 49 which is an inclined surface is formed on a rear surface of the claw edge 48. The guide surface 49 comes into sliding contact with the bulge portion 6 in a process of the insertion of the pipe P to the connector body 1 up to the regular depth, and plays a role of guiding the retainer 37 to retract upward and allowing the pipe P to pass through. On the other hand, a surface of the claw edge 48 on the opposite side to the guide surface 49 is a vertical surface, which further continues toward the front to be a horizontal surface, thereby forming an interference edge 50 in a step shape. As shown in FIG. 23, the interference edge 50 plays a role of interfering with the slip prevention recess 35 of the spring portion 33 and restricting the push-in operation of the retainer 37 when the retainer 37 is pushed in the state where the pipe P is not inserted or half-inserted.

Figure 15:
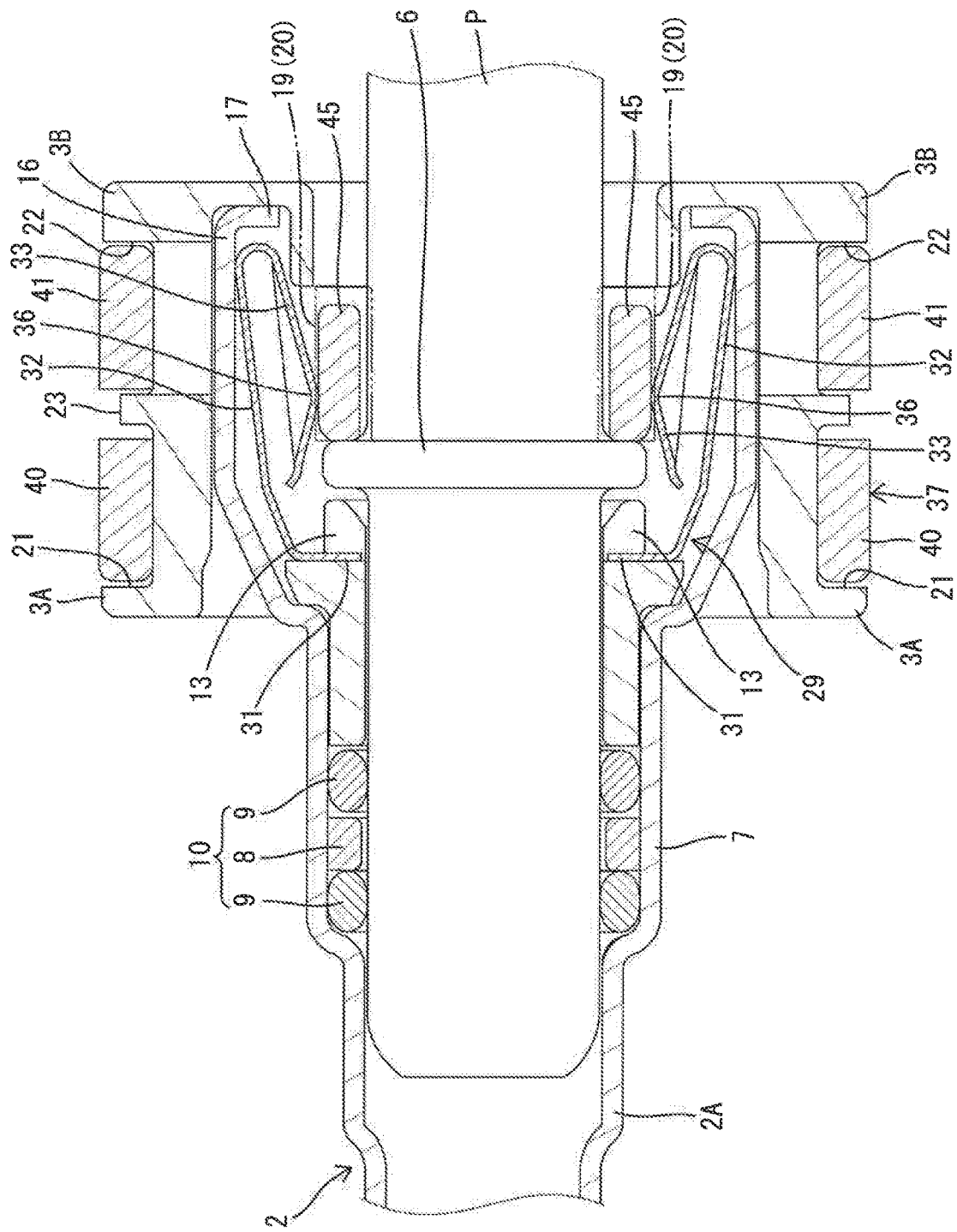
FIG. 15 is a cross-sectional view of the state in which the push-in operation of the retainer has been performed, as seen from the lower side.
Figure 24:
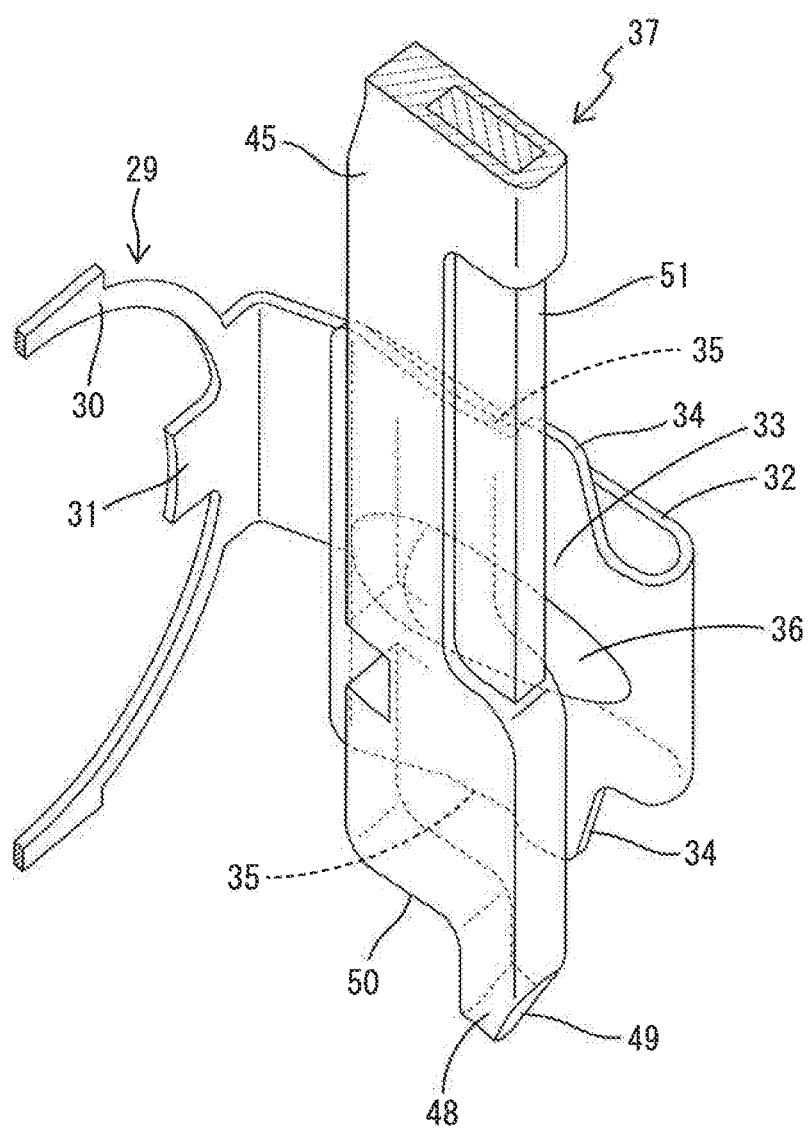
FIG. 24 is a perspective view illustrating a state in which side surfaces of the locking legs push the respective projecting portions of the gate pieces so that the gate pieces are retracted outward, when the push-in operation of the retainer is performed in the state where the pipe is inserted up to the regular depth.

As described above, in the state where the pipe P is inserted up to the regular depth (the state shown in FIG. 13), with respect to the entry path of the locking leg 45, only the projecting portion 36 is located therein as for the spring portion 33, and the bulge portion 6 is also retracted outward. Thus, the interference between these members and the locking leg 45 of the retainer 37 can be avoided. Accordingly, in the state where the pipe P is inserted up to the regular depth, the retainer 37 is allowed to be pushed toward the proper locking position. As shown in FIG. 24, in accordance with the push-in operation of the retainer 37, an outer side surface of the locking leg 45 in the left-right direction begins sliding contact with the projecting portion 36 of the spring portion 33 from an upper portion of the foot, and the outer side surface can flexibly deform the spring portion 33 further outward when passing through the top portion. As a result, as shown in FIG. 15, the spring portions 33 get out of a contact state with the bulge portion 6 and becomes in a separated state.

In the present first embodiment, a metal reinforcement plate 51 is insert molded in the locking legs 45. The locking legs 45 are reinforced by the reinforcement plate 51 so that leg opening deformation in the left-right direction and deflection in the front-rear direction etc. of the locking legs 45 are prevented. The reinforcement plate 51 itself is formed into a substantially downward-facing U shape. Though the reinforcement plate 51 is exposed in the notch 47 and a predetermined range of a lengthwise middle portion, the other portion is embedded in a resin portion. The reason for this configuration is because it is necessary to expose a part of the reinforcement plate due to a setting to a mold at a time of insert molding, and it is necessary to avoid exposure of the reinforcement plate 51 as much as possible thereby avoiding metal contact with the pipe P.

(Checker 42)

Figure 19:
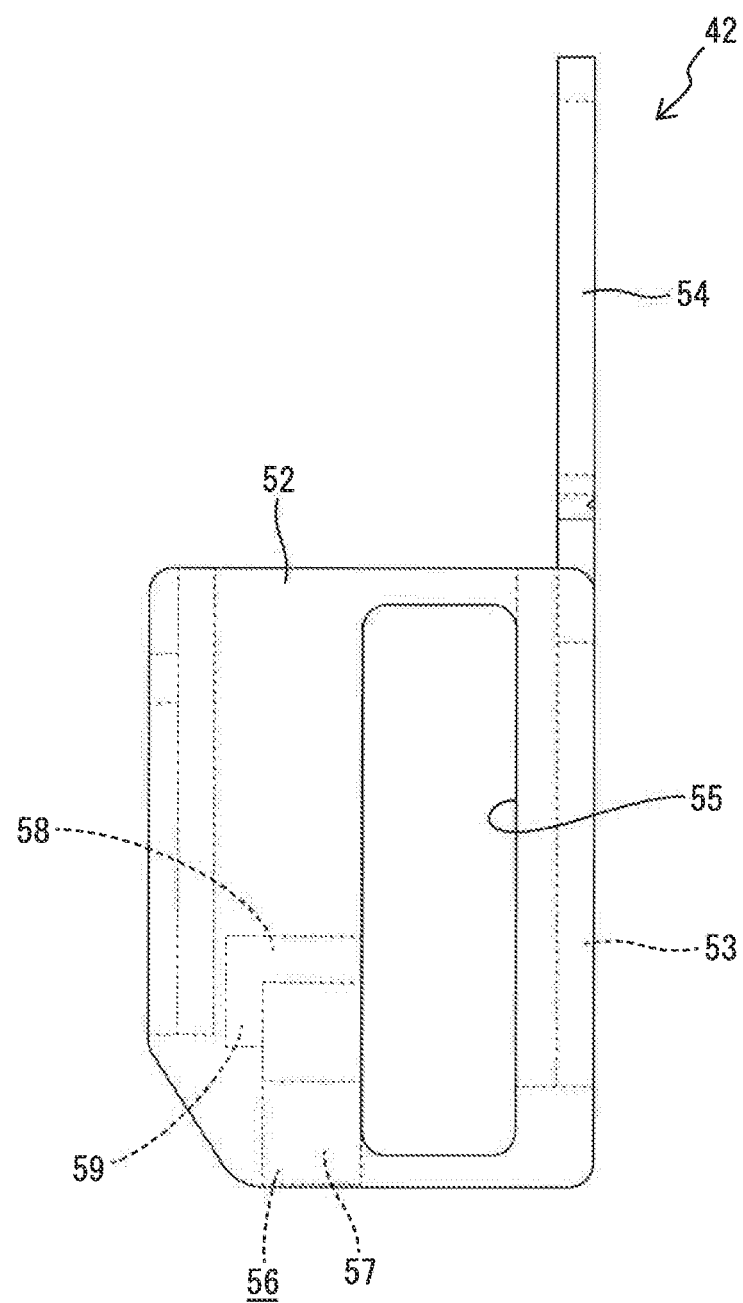
FIG. 19 is a front view of the checker.
Figure 20:
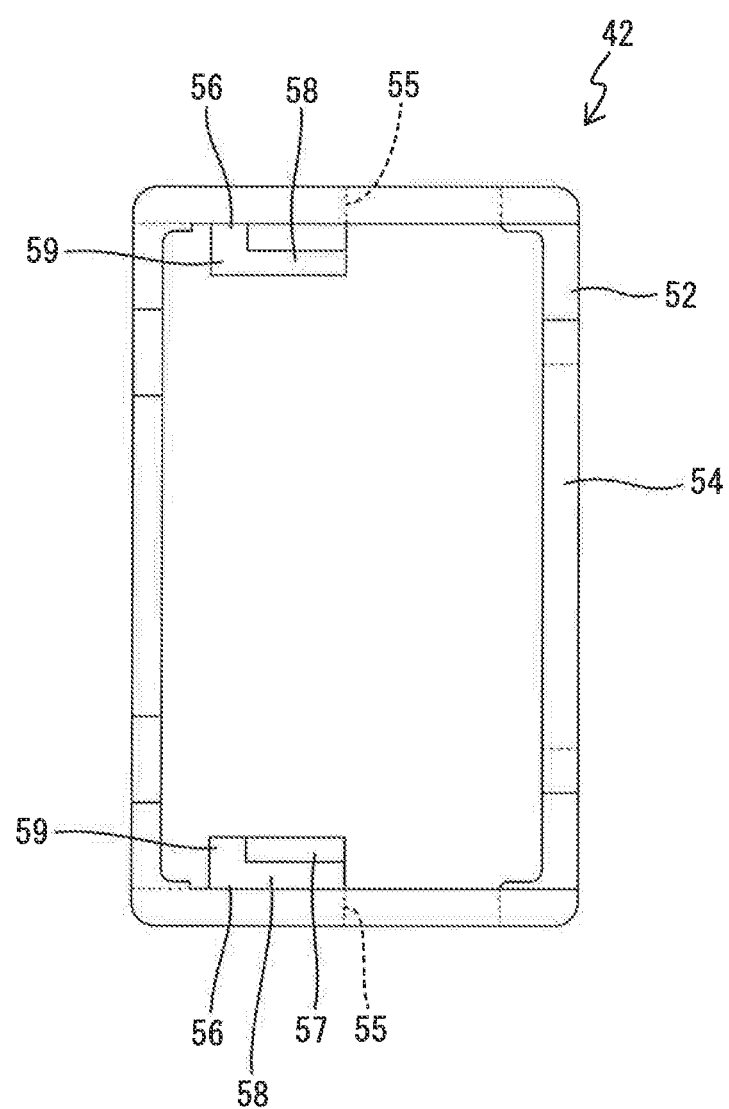
FIG. 20 is a plan view of the checker.

The pipe connector in the present example includes the checker 42 for detecting whether or not the retainer 37 has been pushed in correctly. A specific configuration of the checker 42 itself is shown in FIG. 18 to FIG. 20.

Figure 17:
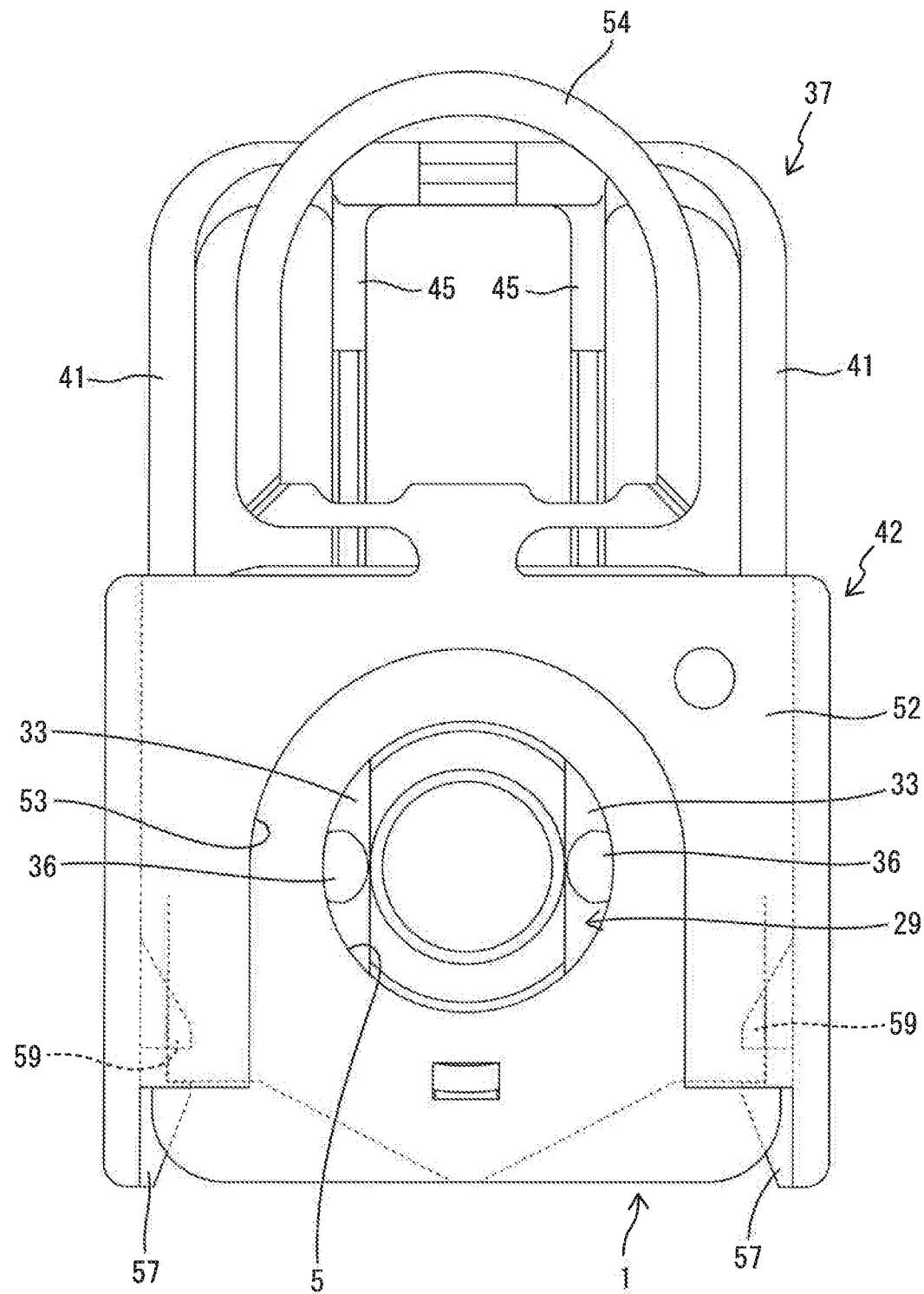
FIG. 17 is a side view of the pipe connector in the state where the checker is mounted, as seen from the rear side.

The checker 42 is made of synthetic resin and has a body frame 52 formed into a rectangular frame shape that is opened in both upper and lower directions. The body frame 52 is fitted from above the connector body 1 in a state where the retainer 37 is mounted on the connector body 1, and is mounted while surrounding the connector body 1 from the outside (refer to FIG. 17).

Figure 18:
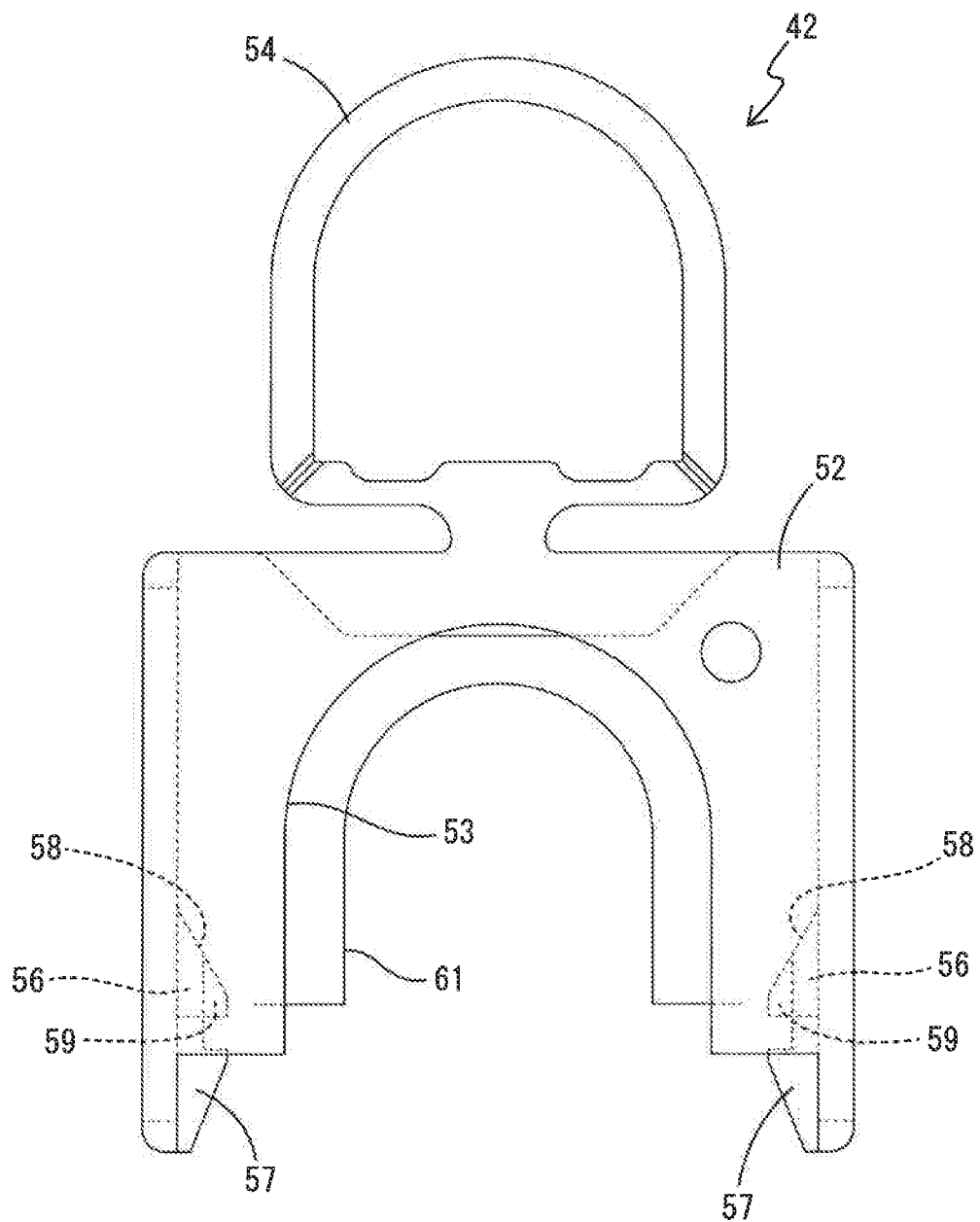
FIG. 18 is a side view of the checker.

An arch portion 61 is formed by cutting out a front surface of the body frame 52 to avoid interference with the pipe connection portion 2A of the joint member 2 (refer to FIG. 18). As shown in the figure, an arch-shaped notch 53 is formed by cutting out a rear surface of the checker 42, as well as in the front surface side, so as to avoid interference when the pipe P is inserted. An operation ring 54 is protrudingly formed at a middle portion in the left-right direction of an upper edge of the rear surface of the body frame 52.

Figure 16:
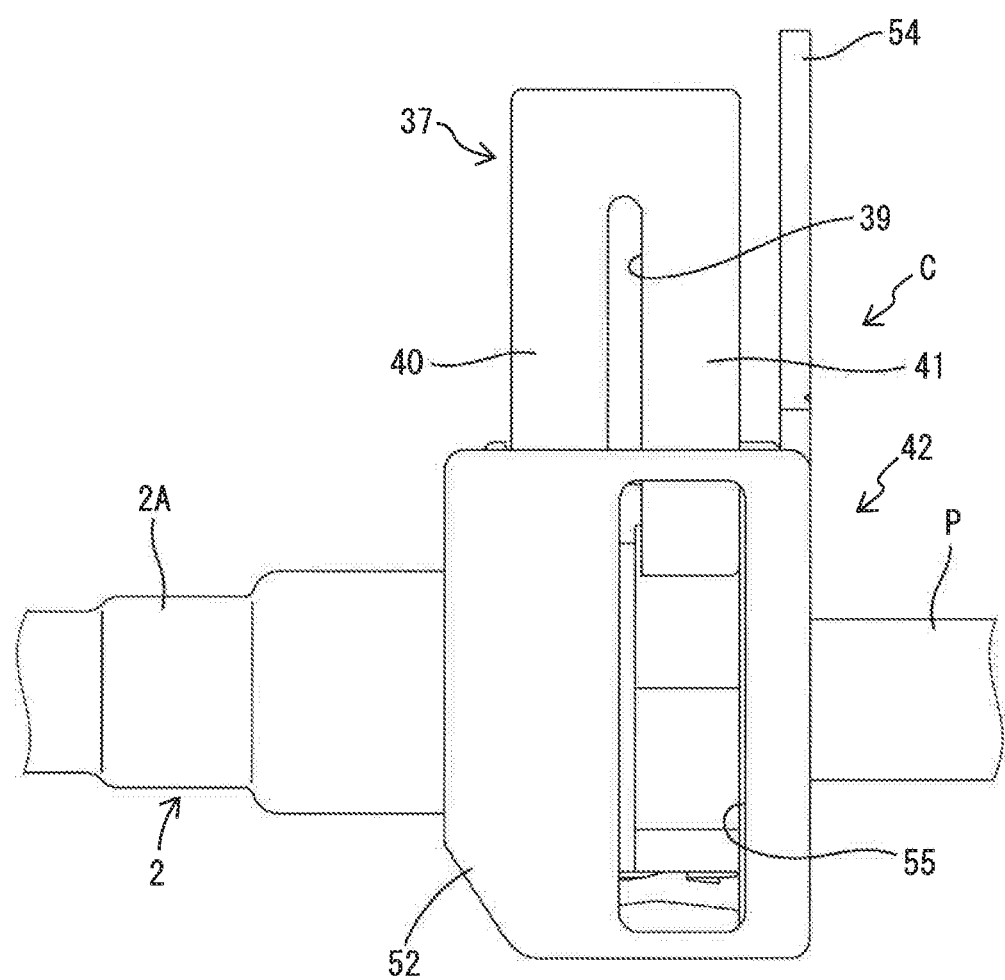
FIG. 16 is a front view of the pipe connector in a state where the checker is mounted.

On both left and right walls of the body frame 52, a pair of window holes 55 is longitudinally opened near the rear portions. As shown in FIG. 16, in a state where the checker 42 is attached, the window holes 55 are opened at positions corresponding to the rear guide legs 41 of the retainer 37. When the locking claw 44 of each rear guide leg 41 comes into sliding contact along the groove surface of the rear guide groove 22 in accordance with the push-in operation of the retainer 37, the rear guide legs 41 are flexibly deformed outward in the left-right direction. At this time, the window hole 55 allows a lower side portion of the rear guide leg 41 to escape outward through the window hole 55, thereby playing a role of allowing the leg opening deformation of the rear guide leg 41.

Figure 21:
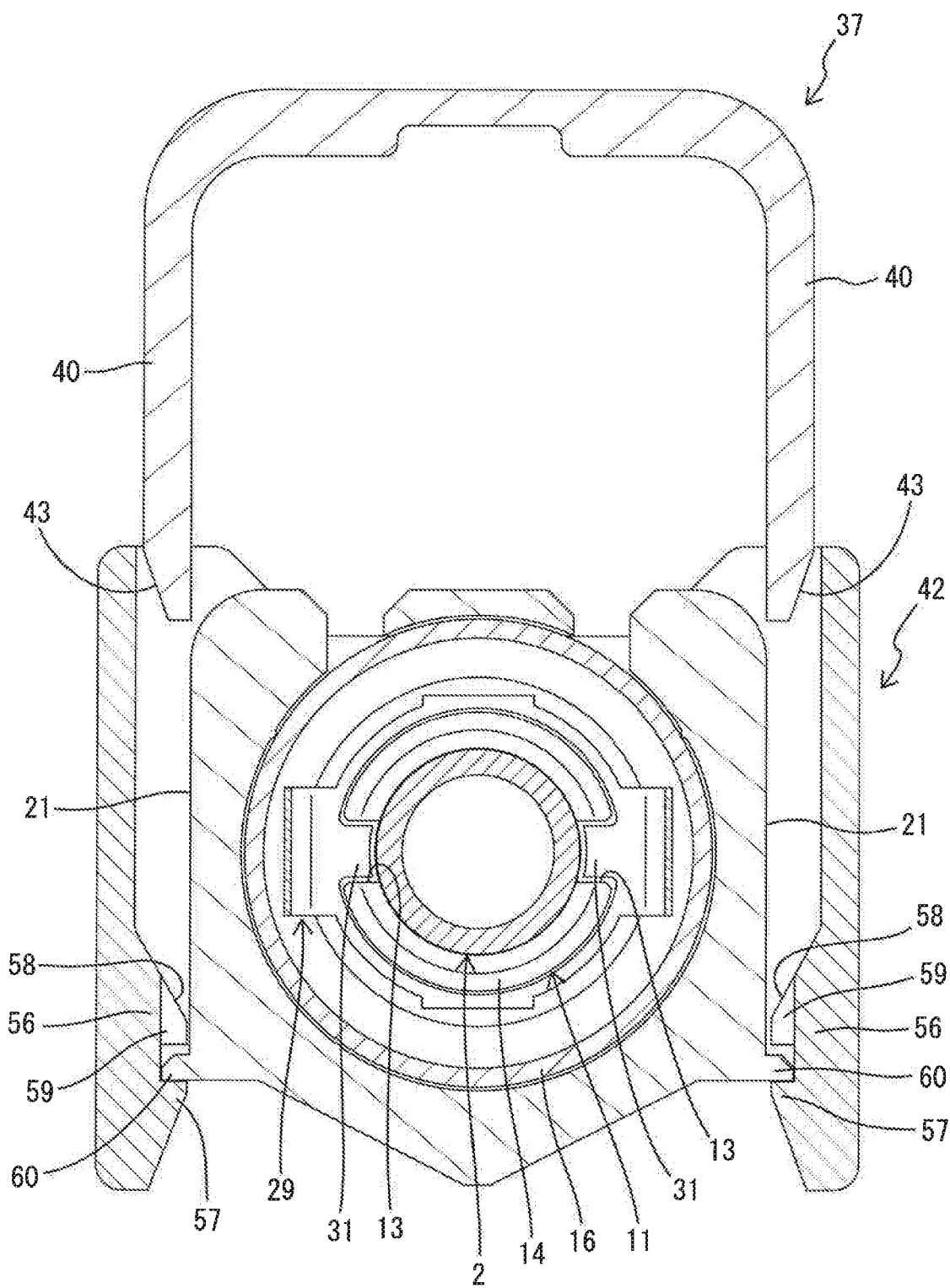
FIG. 21 is a side sectional view of a state in which checker is locked to a connector body, as seen from the rear side.

In lower portions of inner surfaces of both left and right walls of the body frame 52, a pair of left and right trapezoidal portions 56 respectively projects at a position adjacent to front side opening edge of the window hole 55 along the same edges. At a lower portion of each trapezoidal portions 56, an extraction prevention claw 57 is protrudingly formed. As shown in FIG. 21, both extraction prevention claws 57 are locked to the lower end surfaces of the front guide grooves 21 of the connector body 1, so that the checker 42 is not allowed to be pulled out upward from the connector body 1 before the push-in operation of the retainer 37 is performed.

Figure 22:
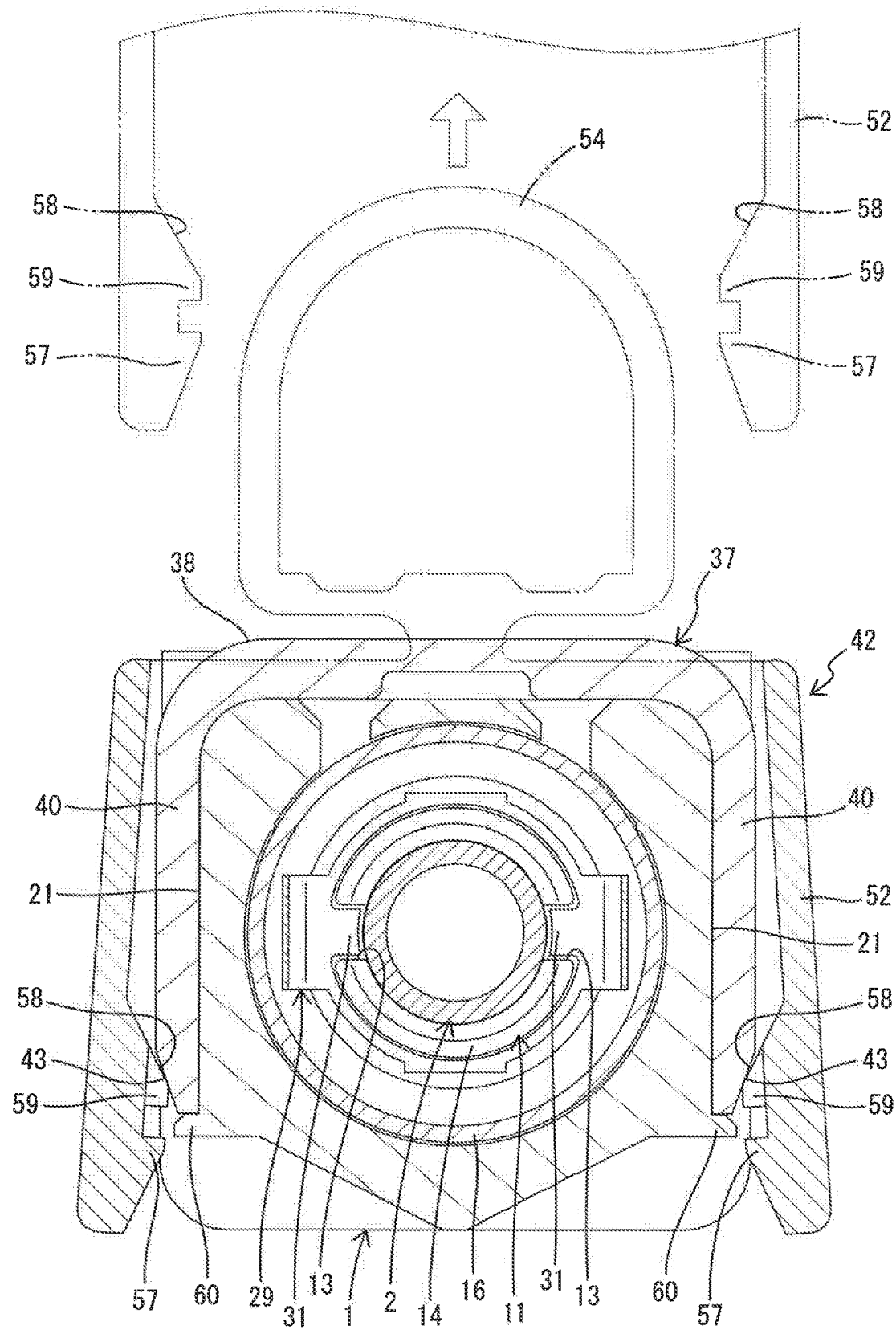
FIG. 22 is a side sectional view illustrating a state in which locking of the checker is released by push-in operation of the retainer.

On the other hand, a wide guide slope 58 is formed on an upper edge portion of each trapezoidal portion 56 over a front-rear range extending further forward than the upper edge of the trapezoidal portion 56. As shown in FIG. 22, when the retainer 37 is properly pushed in, the guide slopes 58 come into sliding contact with the press surfaces 43 of the front guide legs 40 of the retainer 37, whereby the left and right side walls of the checker 42 are forced to be flexibly deformed outward so that the locking of the extraction prevention claws 57 to the connector body 1 is released, thus enabling removal of the checker 42.

In front side edges of the trapezoidal portions 56, a pair of left and right stopper projections 59 project inward above the extraction prevention claws 57. As shown in FIG. 21, each stopper projection 59 abuts on an upper surface of a lower frame piece 60 projecting outwardly at the lower end of the front guide groove 21 of the connector body 1 in the mounted state of the checker 42, so that the checker 42 is not allowed to be pushed down further with respect to the connector body 1.

Function and effect of the present first embodiment configured as described above will be described hereinafter. In a state before the pipe P is inserted, the retainer 37 is held at the temporary locking position with respect to the connector body 1, and the checker 42 is held at the connector body 1 at the position shown in FIGS. 16 and 17.

Even if the retainer 37 is inadvertently pushed down in a state where the pipe P is not inserted, the inadvertent push-in operation of the retainer 37 is restricted since each spring portion 33 of the gate member 29 is located in the entry path of the locking leg 45, and the interference edge 50 of each locking leg 45 of the retainer 37 is in abutment on the slip prevention recess 35 of the spring portion 33 (refer to FIG. 23 and the like). Each locking leg 45 is prevented from being displaced with respect to the spring portion 33 by the slip prevention recess 35.

As shown in FIG. 3, when the pipe P is inserted from the pipe insertion port 5 of the connector body 1 along the axis, the bulge portion 6 of the pipe P comes into sliding contact with the projecting portions 36 of the gate members 29 in the insertion process. As the insertion of the pipe P proceeds and the bulge portion 6 gradually moves toward the top portions with respect to the projecting portions 36, an amount of flexible deformation of each spring portion 33 in the left-right outward direction gradually increases.

On the other hand, at the stage before the pipe P is inserted up to the regular depth, the bulge portion 6 of the pipe P abuts against the guide surfaces 49 formed at the lower ends of both locking legs 45 of the retainer 37. When the pipe P is further inserted from this state, component force of insertion force of the pipe P acts on both locking legs 45 as force in a lifting direction by the action of inclined surfaces configured on the guide surfaces 49. At this time, as described above, since there is the gap between the locking claw 44 of each rear guide leg 41 of the retainer 37 and the ceiling surface 27 in each temporary holding portion 24 of the connector body 1, the entire retainer 37 is displaced to be retracted upward as shown in FIG. 10. Therefore, the bulge portion 6 can pass through the locking legs 45 while pushing up the locking legs 45, with the result that the pipe P is inserted toward a regular position.

Figure 12:
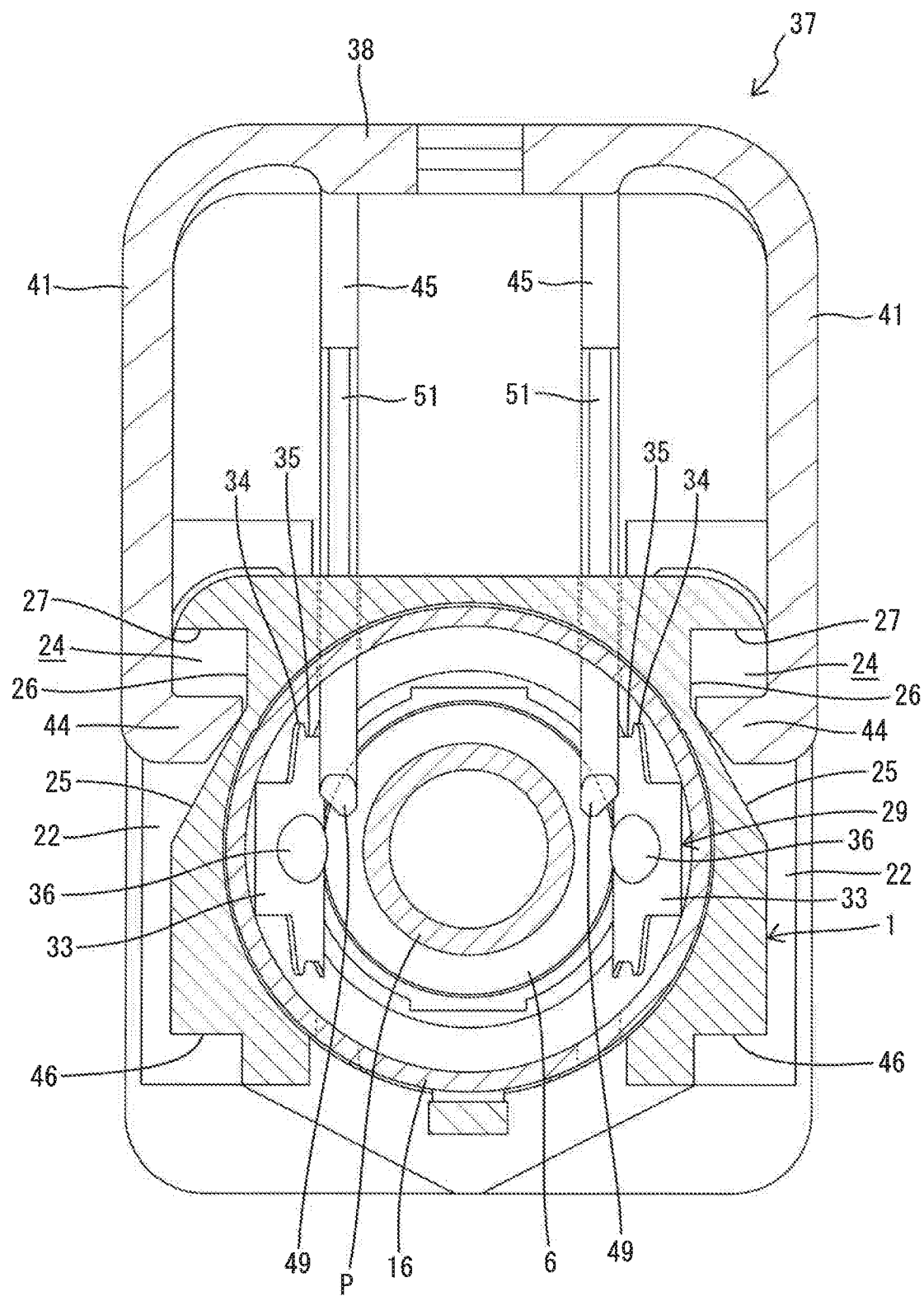
FIG. 12 is a side sectional view of a state in which the pipe is inserted up to a regular depth but before the push-in operation of the retainer is performed, as seen from the rear side.

When the bulge portion 6 has passed through the locking legs 45, the retainer 37 is displaced downward by gravity, and returns to the temporary locking position (in which the lower end portions of both locking legs 45 are located just behind the bulge portion 6) (the state shown in FIG. 12). As a result, as shown in the figure, both locking legs 45 are locked behind the bulge portion 6. Thus, the pipe P can be prevented from being displaced in a removal direction until the retainer 37 is pushed in, which is the next operation.

As described above, inadvertent push-in operation of the retainer 37 is restricted until the pipe P is inserted up to the regular depth (during the half-insertion state). As shown in FIG. 3, when the insertion of the pipe P is started, the bulge portion 6 of the pipe P starts to abut against the spring portions 33. As the insertion of the pipe P proceeds, the bulge portion 6 comes into sliding contact with the projecting portions 36 of the spring portions 33. During the period until the bulge portion 6 reaches the top portion of each projecting portion 36 (the period corresponds to the first half time of the insertion of the pipe P, but a boundary between the "first half" and the "second half" is not strictly defined), the amount of outward deflection of each spring portion 33 is gradually increased by the bulge portion 6. However, the slip prevention recess 35 of each spring portion 33 is located in the entry path of the locking leg 45 of the retainer 37. That is, since the slip prevention recesses 35 and the interference edges 50 of the locking legs 45 are still in an interference state, the push-in operation of the retainer 37 remains restricted.

When the insertion of the pipe P further proceeds and enters the second half time of the insertion, as shown in FIG. 11, the bulge portion 6 of the pipe P reaches the top portion of the projecting portion 36 of each spring portion 33 and is held in an abutment state. At this time, as described above, since the deflection amount of each spring portion 33 is maximized, the slip prevention recess 35 of each spring portion 33 is retracted from the entry path, and only a part of the top portion of each projecting portion 36 is located in the path. Now, in place of the spring portion 33, the bulge portion 6 is located in the entry path. Therefore, even if the push-in operation of the retainer 37 is going to be performed at this time, the interference edges 50 of the locking legs 45 interfere with the bulge portion 6, so that the push-in operation of the retainer 37 still remains restricted.

When the insertion of the pipe P further proceeds and the bulge portion 6 passes through the projecting portion 36 and has reached the distal end portion of each spring portion 33 as shown in FIG. 13, it can be said at this point that the pipe P has been inserted to the connector body 1 up to a regular depth position. At this time, as shown in the figure, the bulge portion 6 is located in front of the projection areas of the through grooves 19 and the insertion grooves 20, that is, outside the entry path. As shown in the figure, although each spring portion 33 is elastically restored slightly from the state shown in FIG. 11, each slip prevention recess 35 is located away from the entry path, and only a part of the top portion of each projecting portion 36 is located in the path.

In a state where the pipe P is inserted up to the regular depth, an operator applies pressing force to the operation plate 38 in order to perform the push-in operation of the retainer 37. As described above, in the state where the pipe P is inserted up to the regular depth, only a part of each projecting portion 36 of the gate member 29 is located in the entry path of each locking leg 45 of the retainer 37. Thus, while the retainer 37 is moved from the temporary locking position to the proper locking position, the outer side surface (resin portion) of each locking leg 45 in the left-right direction comes into sliding contact with the projecting portion 36 and forcibly enters between the projecting portion 36 and a general portion of the pipe P. More specifically, the sliding contact between the locking leg 45 and the projecting portion 36 starts from the foot portion of the projecting portion 36 on the distal end side of the spring portion 33, then the locking leg 45 gradually moves toward the top portion of the projecting portion 36 along the up-down direction, and thereafter, the locking leg 45 is maintained in abutment with the top portion. As a result, as shown in FIG. 15, each spring portion 33 is forced to be flexibly deformed further outward in the left-right direction by the locking leg 45, so that the spring portion 33 gets out of the abutment state against the bulge portion 6 and is separated therefrom (a state shown in FIG. 15). That is, in the state where the retainer 37 has reached the proper locking position, contact between metal members, namely the pipe P and the gate member 29, is eliminated.

During the period in which the retainer moves from the temporary locking position to the proper locking position, the locking claw 44 of each rear guide legs 41 of the retainer 37 is guided by an inclination of the temporary holding surface 25 of the rear guide groove 22 of the connector body 1, so that the rear guide legs 41 are gradually deformed to open the legs in the left-right direction and guided to be displaced downward directly along the rear guide grooves 22.

Each rear guide leg 41 is allowed to be deformed to open the leg through the window hole 55 of the checker 42, and each front guide leg 40 is guided by the front guide groove 21 without being substantially affected by the leg opening deformation of the rear guide leg 41 due to the slit 39. Thus, both front and rear guide legs 40 and 41 are guided by the corresponding guide grooves 21 and 22, with the result that the retainer 37 in its entirety can be displaced straight downward toward the proper locking position (the position shown in FIG. 14).

As described above, when the pipe P is in the non-insertion state or the half-insertion state to the connector body. 1, even if push-down operation of the retainer 37 is going to be performed, each locking leg 45 of the retainer 37 interferes with the slip prevention recess 35 of each spring portion 33 or the bulge portion. 6 of the pipe P, so that the push-in operation is restricted. However, when the pipe P is inserted to the connector body 1 up to the regular depth, the push-in operation of the retainer 37 can be performed. Therefore, the half-insertion of the pipe P can be detected by the fact that the push-in operation of the retainer 37 cannot be performed. Conversely, it can be ensured that the pipe P has been inserted up to the regular depth by the fact that the push-in operation of the retainer 37 can be performed.

In the process in which the retainer 37 reaches the proper locking position, the locking claw 44 of each rear guide leg 41 moves along the groove surface of the rear guide groove 22 following the temporary holding surface 25 while maintaining the leg opening deformation. When the retainer 37 is pushed in until the operation plate 38 abuts on the upper surface of the connector body 1, the rear guide legs 41 are deformed to be restored, and the locking claws 44 are locked to the locking step portions 46. Thus, the retainer 37 in its entirety is held at the proper locking position.

When the retainer 37 is at the proper locking position, as shown in FIG. 14, both locking legs 45 are locked just behind the bulge portion 6 at positions sandwiching the general portion of the pipe P from the left and right directions. As shown in the figure, a vertical range in each locking leg 45 locked to the bulge portion 6 is a range reinforced by the reinforcement plate 51. Therefore, even if strong force in the removal direction acts on the pipe P, both the locking legs 45 are not deformed to open the legs, which ensures the locking to the bulge portion 6.

When the retainer 37 has thus reached the proper locking position, the checker 42 is subsequently removed. In the process in which the retainer 37 moves to the proper locking position, the press surfaces 43 of the front guide legs 40 of the retainer 37 respectively come into sliding contact with the guide slopes 58 of the trapezoidal portions 56 of the checker 42, thereby forcing the left and right side walls of the checker 42 to be flexibly deformed outward. As a result, the locking of the extraction prevention claws 57 to the lower frame pieces 60 of the connector body 1 is released. Therefore, when the operator pulls up the operation ring 54 in this state, the checker 42 can be removed from the connector body 1. On the contrary, even if the checker 42 is going to be removed before the retainer 37 reaches the proper locking position, the checker 42 cannot be removed since the locking of the extraction prevention claws 57 is maintained. Thus, based on whether or not the checker 42 can be removed, the operator can recognize whether or not the push-in operation of the retainer 37 has been properly performed and also whether or not the pipe P has been inserted up to the regular depth and the pipe P is properly retained.

Main effects of the present first embodiment are as follows.

When the retainer 37 is moved to the proper locking position, each locking leg 45 deforms the spring portion 33 of the gate member 29 flexibly outward, so that the contact between the spring portion 33 and the bulge portion 6 both of which are metal members, can be eliminated. Therefore, fretting wear at the above contact portion due to high-speed vibration of an engine or the like can be avoided in advance. Thus, in addition to a function of detecting the half-insertion of the pipe P and a function of retaining the pipe P, the retainer 37 of the present first embodiment has a contact avoiding function of separating the spring portions 33 from the pipe P, so that high functionality of the retainer 37 is achieved.

In addition, the contact avoiding function is ensured by the retainer 37 reaching the proper locking position. On the other hand, at least when the retainer 37 has reached the proper locking position, the checker 42 can be removed. Therefore, the contact avoiding function is also ensured through whether or not the checker 42 can be removed.

Furthermore, the retracted amount of the spring portion 33 can be easily increased by a simple configuration of forming the projecting portion 36 on each spring portion 33. This can more reliably avoid a contact between the pipe P and the spring portion 33.

In the present first embodiment, the non-insertion and half-insertion states of the pipe P are reliably avoided. In the state where the pipe P is not inserted or in the first half time of the insertion of the pipe P, the locking legs 45 interfere with the slip prevention recesses 35 of the spring portions 33, and in the second half time of the insertion of the pipe P until just before reaching the regular depth, the locking legs 45 interfere with the bulge portion 6, so that the push-in operation of the retainer 37 is restricted. This ensures that the pipe P is connected in a proper state.

Still furthermore, in the present first embodiment, both locking legs 45 of the retainer 37 are reinforced by the metal reinforcement plate 51. Accordingly, the retaining performance for the pipe P is enhanced, and also the leg opening deformation or the like is less likely to be caused in the locking legs 45. As a result, the entry path of each locking leg 45 does not deviate from a regular path, so that the projecting portion 36 of each spring portion 33 can be reliably pressed. This can contribute in maintaining the contact avoiding function described above.

In the present first embodiment, when the pipe P is inserted to the connector body 1 up to the regular depth, the locking legs 45 are pushed up by the bulge portion 6 so that the retainer 37 in its entirety is temporarily retracted upward, and after the pipe P has been inserted up to the regular depth, the retainer 37 in its entirety s returned downward to an original position (the temporary locking position). As a result, in the state where the pipe P is inserted up to the regular depth, the bulge portion 6 is shallowly locked to the locking legs 45 so that the pipe P is held temporarily at the regular depth position, which can maintain a positional relationship between the bulge portion 6 and the spring portions of the gate member 29 in a regular relationship. Therefore, such effect also can be obtained that the subsequent push-in operation of the retainer 37 can be performed smoothly.

Second Embodiment

FIG. 25 to FIG. 28 illustrate second embodiment of the present invention. The projecting portion 36 is formed on the spring portion 33 in the first embodiment, but in the second embodiment, a projecting portion 70 is provided on a locking leg 71 of the retainer 37.

In the present second embodiment, since the projecting portion 70 is provided on each locking leg 71, opening shapes of the through groove 19 and the insertion groove 20 are formed in convex shapes so as to allow the projecting portion 70 to be inserted therethrough.

Unlike the first embodiment, each spring portion 73 of a gate member 72 in the second embodiment is not provided with a projecting portion. Therefore, as shown in FIG. 25, the spring portion 73 forms a plane as a whole, and extends obliquely toward the distal end so as to gradually approach the pipe P.

Figure 25:
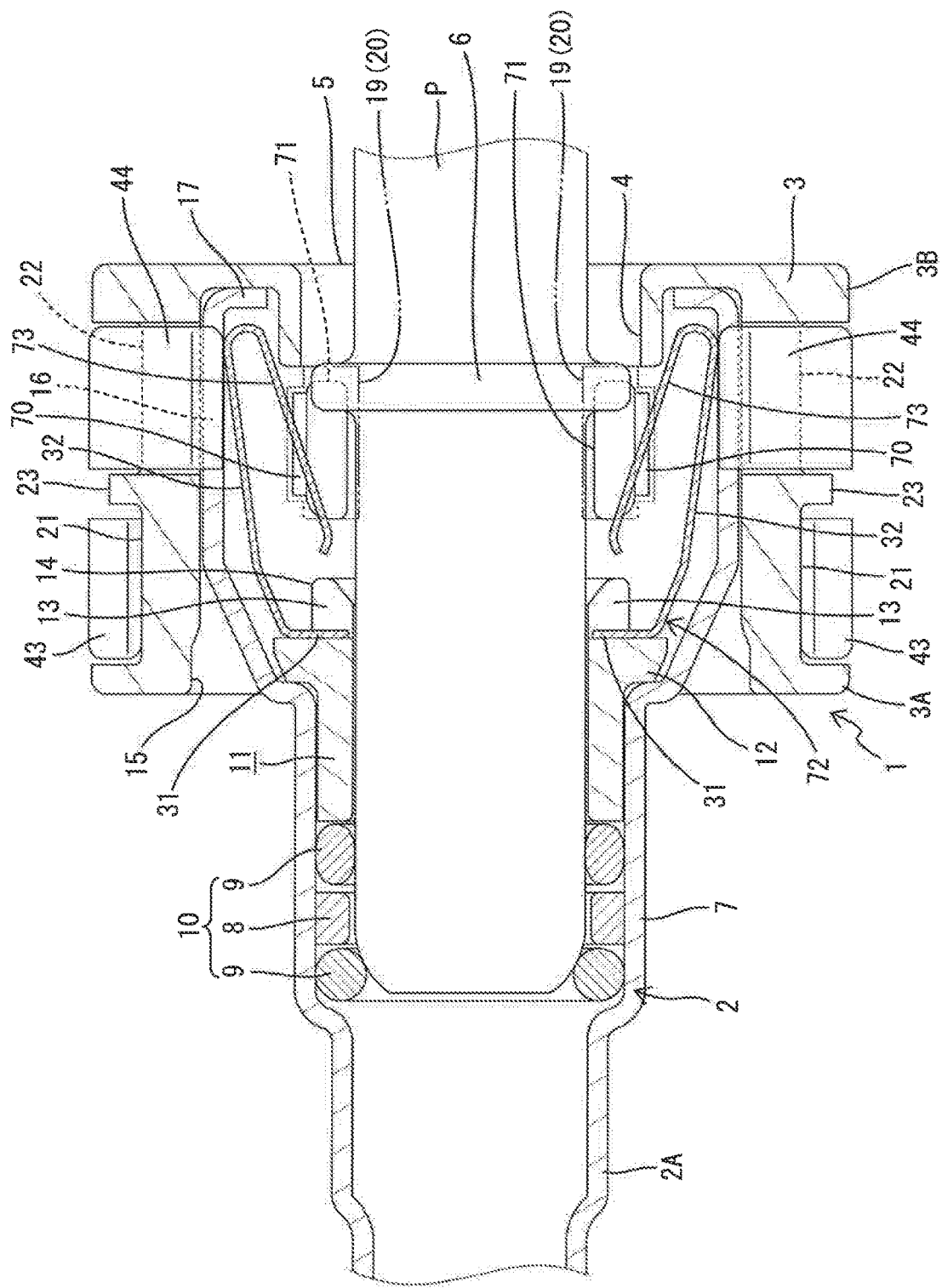
FIG. 25 is a view corresponding to FIG. 3 in a second embodiment.

As shown in FIG. 25, a region in the spring portion 73 from the intermediate portion in the front-rear direction to slightly before the distal end is located across the projection region of the through groove 19 and the insertion groove 20, that is, the entry path of the locking leg 71. However, in the present second embodiment, since the projecting portion 70 is not provided on the spring portion 73, an angle crossing the entry path is deeper than that of the spring portion of the first embodiment, that is, it is configured to enter the entry path more deeply (refer to comparison between. FIG. 3 and FIG. 25).

Figure 28:
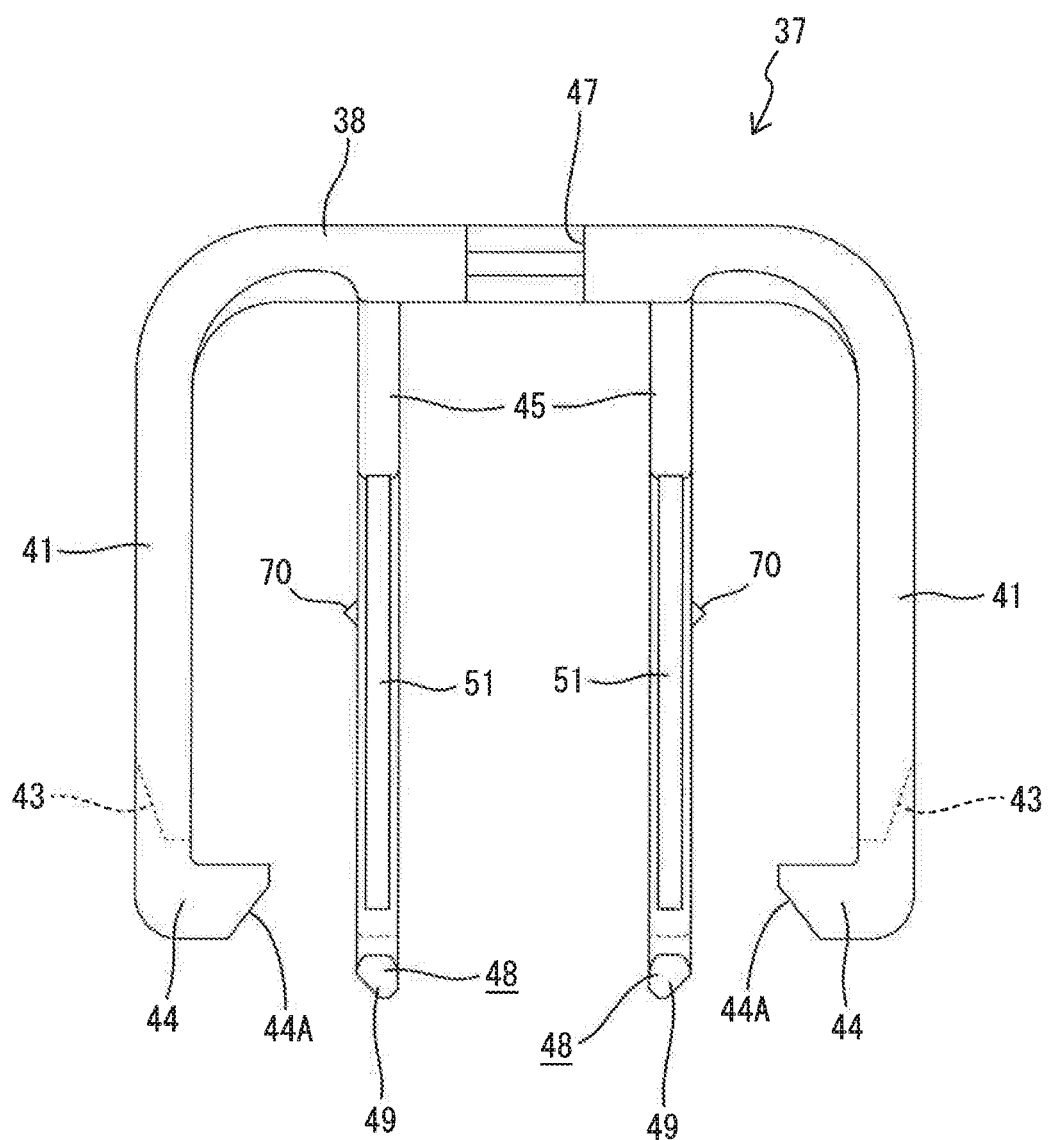
FIG. 28 is a side view of the retainer in the second embodiment, as seen from the rear side.

As shown in FIG. 28, each of the projecting portions 70 in the second embodiment is provided on the side surface of each locking legs 71 of the retainer 37 that is opposite to the spring portion 73. Each projecting portion 70 is arranged at a middle portion in the up-down direction of the locking leg 71 and has a substantially equilateral triangular prism shape that is long in the front-rear direction with a top and a bottom thereof being inclined. The projecting portion 70 abuts on the spring portion 73 at least when the retainer 37 reaches the proper locking position, and can separate the spring portion 73 from the bulge portion 6.

According to the second embodiment configured as described above, each spring portion 73 is arranged so as to be across the entry path of the locking leg 71 in the period from when the pipe P starts to be inserted until the pipe P is inserted up to the regular depth, as shown in FIG. 25. In other words, during this period, the slip prevention recess 35 of each spring portion 73 is located in the entry path, so that the push-in operation of the retainer 37 is restricted.

Figure 26:
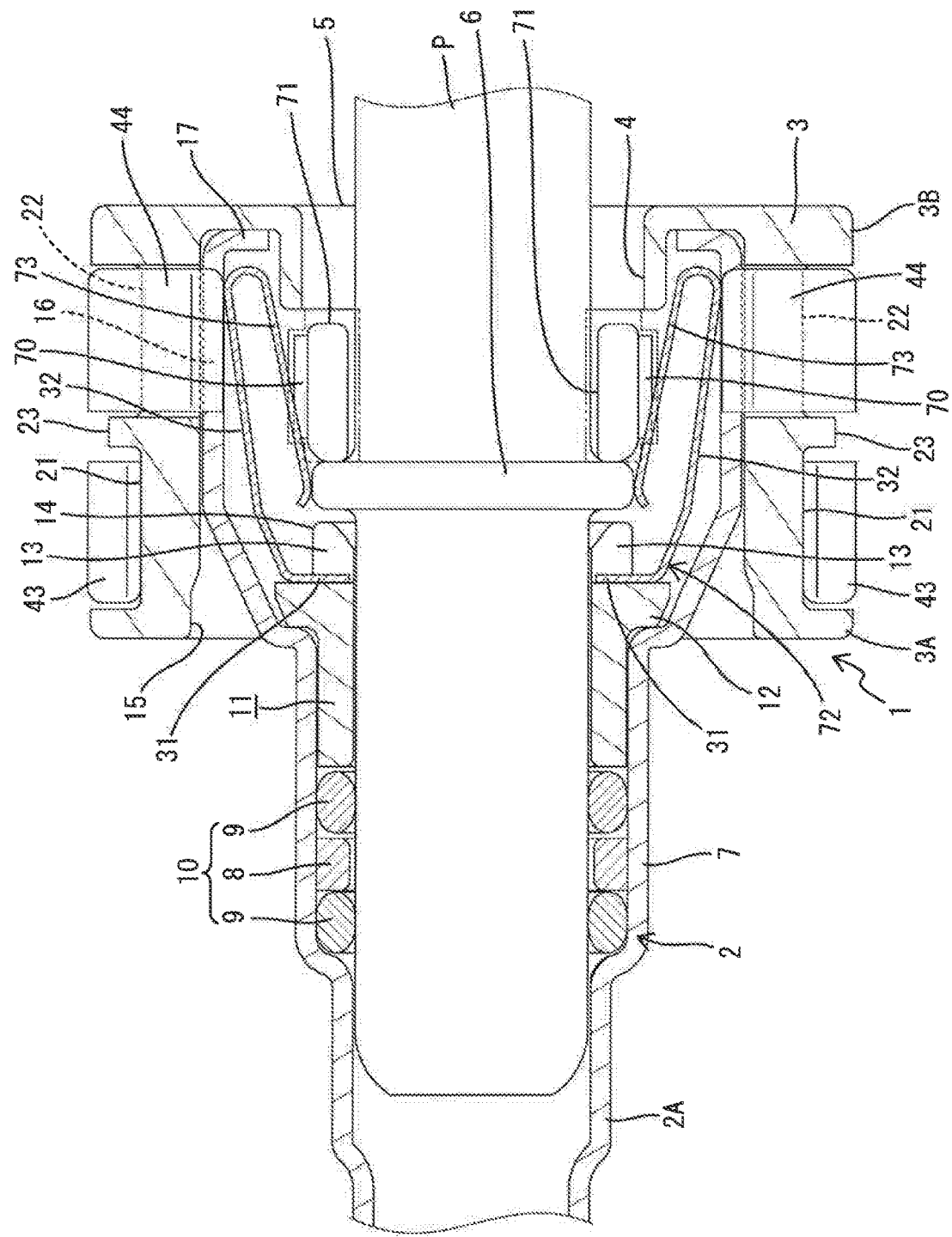
FIG. 26 is a view corresponding to FIG. 13 in the second embodiment.

However, when the insertion of the pipe P proceeds further and the pipe P reaches a regular insertion position shown in FIG. 26, the deflection amount of each spring portion 73 is maximized due to the abutment on the bulge portion 6 of the pipe P. As a result, each spring portion 73 including the slip prevention recess 35 is retracted substantially outside the entry path. (The entire spring portion 73 does not necessarily have to be completely retracted outside the entry path, and it does not matter as long as a part of the spring portion 73 slightly gets in the entry path.) At this time, the bulge portion 6 of the pipe P is in abutment against the distal end portion of each spring portion 73.

Figure 27:
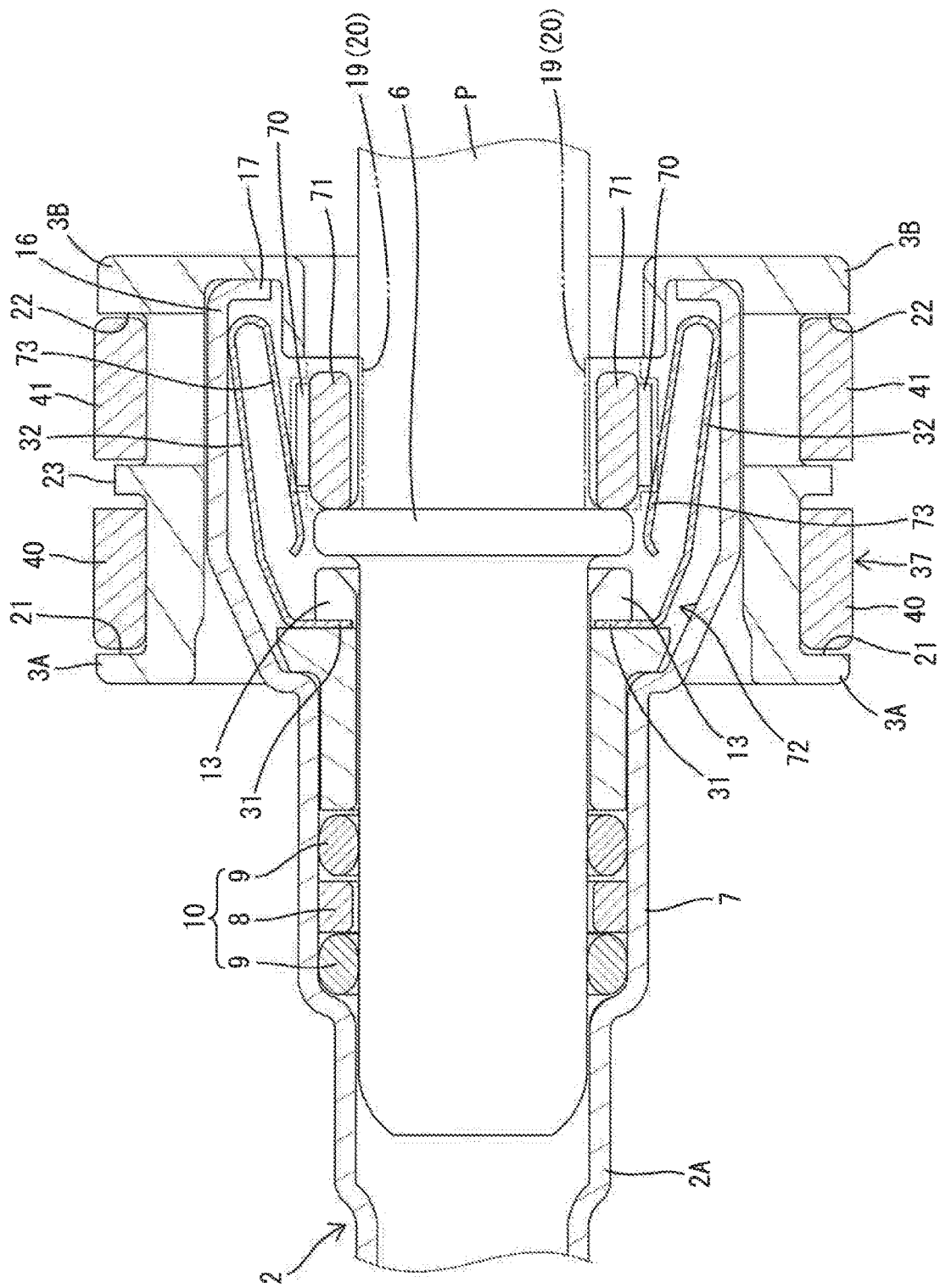
FIG. 27 is a view corresponding to FIG. 15 in the second embodiment.

Therefore, when the retainer 37 is pushed in toward the proper locking position, each locking leg 71 can enter between the spring portion 73 and the pipe P without interfering with the spring portion 73 and can move downward directly. When the retainer 37 then reaches the proper locking position, the spring portions 73 are pushed by top portions of the projecting portions 70, and are flexibly deformed outward in the left-right direction. As a result, as shown in FIG. 27, the bulge portion 6 and each spring portion 73 are separated from each other. Thus, the contact between the pipe P and the spring portion 73 both of which are metal members is eliminated, so that the fretting wear can be avoided in advance.

Since the other configurations are the same as those of the first embodiment, the same effects as those of the first embodiment can be exerted.

Other Examples

The present invention is not limited to the embodiments described above with reference to the drawings. For example, the following embodiments are also included in technical scope of the present invention.

(1) In the above embodiments, the retainer 37 is pushed to the connector body 1 from the radial direction of the pipe P so that the pipe P is retained. Instead of this method, the retainer 37 may be pushed in from a rear side of the pipe P along the axial direction to retain the pipe P. In this method, however, the pipe P cannot be extracted unless the retainer 37 is completely removed from the connector body 1. In this respect, the method of the present embodiments has an advantage that the pipe P can be extracted only by returning the retainer 37 to the temporary locking position.

(2) Although the pipe P and the gate member 29 are both made of metal in the above embodiments, either one may be made of resin or both may be made of resin.

(3) Although the locking legs 45 of the retainer 37 are reinforced by a metal insert in the above embodiments, other reinforcement measures may be taken, such as increasing thickness and width of resin material, or providing a rib shape.

REFERENCE SIGNS LIST 1 connector body
6 bulge portion
29, 72 gate member
33, 73 spring portion
35 slip prevention recess
36, 70 projecting portion
37 retainer
42 checker
45, 71 locking leg (lock portion)
P Pipe

The invention claimed is:

1. A pipe connector, comprising:
a connector body into which a pipe having a larger-diameter bulge portion at an end portion thereof can be inserted;
a gate member incorporated in the connector body and having a spring portion that is configured to abut against the pipe when the pipe is inserted to the connector body and configured to be elastically displaced in a direction of retracting outward while maintaining an abutment state to allow the pipe to be inserted up to a regular depth; and
a retainer that is assembled to the connector body such that push-in operation of the retainer with respect to the connector body can be performed in a state where the pipe is inserted to the connector body up to the regular depth, the retainer having a lock portion that is configured to be locked to the bulge portion and hold the pipe in a retained state when the push-in operation is performed to the connector body up to a proper locking position,
wherein at least one of the spring portion and the lock portion includes a projecting portion that is protrudingly formed and is configured to abut against another one of the spring portion and the lock portion when the retainer is pushed in,
wherein when the retainer is pushed in up to the proper locking position, the lock portion enters between the pipe and the spring portion,
wherein due to an abutment of the projecting portion and the other of the spring portion and the lock portion, the spring portion is elastically displaced in a direction away from the pipe, and
wherein in a state where the retainer has been pushed in up to the proper locking position, the pipe and the spring portion are separated from each other.

2. The pipe connector according to claim 1, wherein the projecting portion is protrudingly formed on an opposite surface of the spring portion to the lock portion, the projecting portion being configured to abut against the lock portion when the retainer is pushed in.

3. The pipe connector according to claim 2, wherein
in a state where the pipe is not inserted to the connector body or in a first half time of insertion of the pipe, at least a part of the spring portion is located so as to be able to interfere with the lock portion with respect to an entry path of the lock portion in the push-in operation of the retainer, so that the push-in operation of the retainer is restricted, in a second half time of the insertion of the pipe and when the pipe has not reached a regular depth with respect to the connector body, the spring portion is located so as to be able to avoid interference with the lock portion with respect to the entry path, but the bulge portion is allowed to interfere with the lock portion with respect to the entry path, so that the push-in operation of the retainer is restricted, and in a state where the pipe is inserted to the connector body up to the regular depth, the bulge portion is displaced to a position outside the entry path, so that the push-in operation of the retainer is allowed.

4. The pipe connector according to claim 1, wherein at least a portion of the lock portion that comes into contact with the pipe and the spring portion is formed of resin.

5. The pipe connector according to claim 4, wherein the retainer has a reinforcement structure that reinforces the lock portion.

6. The pipe connector according to claim 1, wherein the projecting portion is protrudingly formed on an opposite surface of the lock portion to the spring portion, the projecting portion being configured to abut against the spring portion when the retainer is pushed in.

7. A pipe connector, comprising:
a connector body into which a pipe having a larger-diameter bulge portion at an end portion thereof can be inserted;
a gate member incorporated in the connector body and having a spring portion that is configured to abut against the pipe when the pipe is inserted to the connector body and configured to be elastically displaced in a direction of retracting outward while maintaining an abutment state to allow the pipe to be inserted up to a regular depth; and
a retainer that is assembled to the connector body such that push-in operation of the retainer with respect to the connector body can be performed in a state where the pipe is inserted to the connector body up to the regular depth, the retainer having a lock portion that is configured to be locked to the bulge portion and hold the pipe in a retained state when the push-in operation is performed to the connector body up to a proper locking position,
wherein when the retainer is pushed in up to the proper locking position, the lock portion enters between the pipe and the spring portion and elastically displaces the spring portion in a direction away from the pipe, and
wherein the lock portion includes a projecting portion that is protrudingly formed on an opposite surface of the lock portion to the spring portion, the projecting portion being configured to abut against the spring portion when the retainer is pushed in.

8. The pipe connector according to claim 7, wherein
in a state where the pipe is not inserted or half-inserted to the connector body, at least a part of the spring portion is located so as to be able to interfere with the lock portion with respect to an entry path of the lock portion in the push-in operation of the retainer, so that the push-in operation of the retainer is restricted, and
in a state where the pipe is inserted to the connector body up to the regular depth, the spring portion is located so as to be able to avoid interference with the lock portion with respect to the entry path, so that the push-in operation of the retainer is allowed.

9. A pipe connector, comprising:
a connector body into which a pipe having a larger-diameter bulge portion at an end portion thereof can be inserted;
a gate member incorporated in the connector body and having a spring portion that is configured to abut against the pipe when the pipe is inserted to the connector body and configured to be elastically displaced in a direction of retracting outward while maintaining an abutment state to allow the pipe to be inserted up to a regular depth; and
a retainer that is assembled to the connector body such that push-in operation of the retainer with respect to the connector body can be performed in a state where the pipe is inserted to the connector body up to the regular depth, the retainer having a lock portion that is configured to be locked to the bulge portion and hold the pipe in a retained state when the push-in operation is performed to the connector body up to a proper locking position,
wherein when the retainer is pushed in up to the proper locking position, the lock portion enters between the pipe and the spring portion and elastically displaces the spring portion in a direction away from the pipe, and
wherein the pipe connector further comprises a checker that is mounted on the connector body, the checker being ordinarily locked to the connector body so as not to be removable, the checker being configured to be released from locking and become removable when the retainer has been pushed into the connector body up to the proper locking position.

10. The pipe connector according to claim 9, wherein the spring portion includes a projecting portion that is protrudingly formed on an opposite surface of the spring portion to the lock portion, the projecting portion being configured to abut against the lock portion when the retainer is pushed in.

11. The pipe connector according to claim 9, wherein the lock portion includes a projecting portion that is protrudingly formed on an opposite surface of the lock portion to the spring portion, the projecting portion being configured to abut against the spring portion when the retainer is pushed in.

12. The pipe connector according to claim 9, wherein
in a state where the pipe is not inserted to the connector body or in a first half time of insertion of the pipe, at least a part of the spring portion is located so as to be able to interfere with the lock portion with respect to an entry path of the lock portion in the push-in operation of the retainer, so that the push-in operation of the retainer is restricted,
in a second half time of the insertion of the pipe and when the pipe has not reached a regular depth with respect to the connector body, the spring portion is located so as to be able to avoid interference with the lock portion with respect to the entry path, but the bulge portion is allowed to interfere with the lock portion with respect to the entry path, so that the push-in operation of the retainer is restricted, and
in a state where the pipe is inserted to the connector body up to the regular depth, the bulge portion is displaced to a position outside the entry path, so that the push-in operation of the retainer is allowed.

13. The pipe connector according to claim 9, wherein
in a state where the pipe is not inserted or half-inserted to the connector body, at least a part of the spring portion is located so as to be able to interfere with the lock portion with respect to an entry path of the lock portion in the push-in operation of the retainer, so that the push-in operation of the retainer is restricted, and in a state where the pipe is inserted to the connector body up to the regular depth, the spring portion is located so as to be able to avoid interference with the lock portion with respect to the entry path, so that the push-in operation of the retainer is allowed.

\* \* \* \* \*